United States Patent
Goldman et al.

(10) Patent No.: US 11,762,946 B1
(45) Date of Patent: Sep. 19, 2023

(54) SYSTEMS FOR USING SHIFTER CIRCUIT AND 3×3 CONVOLVER UNITS TO EMULATE FUNCTIONALITY OF LARGER SIZED CONVOLVER UNITS

(71) Applicant: Recogni Inc., San Jose, CA (US)

(72) Inventors: Gary S. Goldman, Los Altos, CA (US); Shabarivas Abhiram, Mountain View, CA (US)

(73) Assignee: Recogni Inc., San Jose, CA (US)

( * ) Notice: Subject to any disclaimer, the term of this patent is extended or adjusted under 35 U.S.C. 154(b) by 0 days.

(21) Appl. No.: 17/934,702

(22) Filed: Sep. 23, 2022

(51) Int. Cl.
  *G06F 17/15* (2006.01)
  *G06F 5/01* (2006.01)
  *G06F 17/16* (2006.01)

(52) U.S. Cl.
  CPC .............. *G06F 17/153* (2013.01); *G06F 5/01* (2013.01); *G06F 17/16* (2013.01)

(58) Field of Classification Search
  CPC .... G06F 17/15–153; G06F 17/16; G06F 5/01; G06F 7/5443; G06N 3/063
  See application file for complete search history.

(56) References Cited

U.S. PATENT DOCUMENTS

| | | | |
|---|---|---|---|
| 10,872,038 B1* | 12/2020 | Nair ..................... | G06F 9/30036 |
| 10,990,648 B2 | 4/2021 | Janedula et al. | |
| 2011/0239032 A1* | 9/2011 | Kato .................... | G06K 9/6217 |
| | | | 713/500 |
| 2018/0137414 A1* | 5/2018 | Du ......................... | G06F 1/3206 |
| 2019/0114499 A1* | 4/2019 | Delaye .................. | G06V 10/955 |
| 2019/0205780 A1* | 7/2019 | Sakaguchi ........... | G06N 3/0454 |
| 2019/0340498 A1* | 11/2019 | Mills .................... | G06N 3/0454 |
| 2020/0210806 A1* | 7/2020 | Lee .......................... | G06F 17/15 |
| 2020/0326910 A1* | 10/2020 | Parikh .................... | G06F 17/18 |
| 2021/0056396 A1* | 2/2021 | Majnemer .............. | G06N 3/063 |
| 2022/0092399 A1* | 3/2022 | Boyd ...................... | G06F 7/523 |

OTHER PUBLICATIONS

Bosi; et al., "Reconfigurable Pipelined 2-D Convolvers for Fast Digital Signal Processing", IEEE Transactions on Very Large Scale Integration (VLSI) Systems, Sep. 1999, 7(3):299-308.

(Continued)

*Primary Examiner* — Emily E Larocque
*Assistant Examiner* — Carlo Waje
(74) *Attorney, Agent, or Firm* — ASCENDA LAW GROUP, PC

(57) ABSTRACT

Convolution with a 5×5 kernel involves computing the dot product of a 5×5 data block with a 5×5 kernel. Instead of computing this dot product as a single sum of 25 products, the dot product is computed as a sum of four partial sums, where each partial sum is computed as a dot product of a 3×3 data block with a 3×3 kernel. The four partial sums may be computed by a single 3×3 convolver unit over four time periods. During each time period, at least some of the weights received by the 3×3 convolver unit may correspond to a quadrant of weights from the 5×5 kernel. A shifter circuit provides shifted columns (left or right shifted) of the input data to the 3×3 convolver unit, allowing the 3×3 convolver unit access to the 3×3 data block that spatially corresponds to a particular quadrant of weights from the 5×5 kernel.

21 Claims, 39 Drawing Sheets

(56) References Cited

OTHER PUBLICATIONS

Du; et al., "A Reconfigurable Streaming Deep Convolutional Neural Network Accelerator for Internet of Things", Circuits and Systems I: Regular Papers, IEEE Transactions, Jul. 2017, pp. 1-10.
Landeta; et al., "Two-dimensional convolver architecture for real-time image processing", Proc. SPIE, Nov. 1989, 1199:1095-1105, abstract only, downloaded from: https://ui.adsabs.harvard.edu/abs/1989SPIE.1199.1095L/abstract, 1 pg.

* cited by examiner

SYSTEMS FOR USING SHIFTER CIRCUIT AND 3×3 CONVOLVER UNITS TO EMULATE FUNCTIONALITY OF LARGER SIZED CONVOLVER UNITS

FIELD OF THE INVENTION

The present invention relates to methods and systems for convolving input data with a kernel, and more particularly relates to using a shifter circuit and 3×3 convolver units to emulate the functionality of larger sized convolver units.

BACKGROUND

Convolution with a 5×5 kernel involves computing the dot product of a 5×5 block of data with a 5×5 kernel. While such computation may be computed using a 5×5 convolver unit specially dedicated to compute the dot product of two 5×5 matrices, such dedicated circuit is costly in terms of the chip area, and the same drawback holds for other dedicated convolver units (e.g., 7×7, 9×9, etc.).

SUMMARY OF THE INVENTION

In accordance with one embodiment of the invention, the default convolver units have a size of 3×3 (i.e., are configured to compute a dot product of two 3×3 matrices). Instead of computing a dot product of two 5×5 matrices as a single sum of 25 products, the dot product is computed as a sum of four partial sums, where each partial sum is computed as a dot product of a 3×3 data block with a 3×3 kernel. The four partial sums may be computed by a single 3×3 convolver unit over four time periods. During each of the time periods, at least some of the weights received by the 3×3 convolver unit may correspond to a quadrant of the weights from the 5×5 kernel. The quadrants may be formed by two cut lines through the 5×5 kernel and may include a northwest, a northeast, a southwest and a southeast quadrant.

A shifter circuit provides shifted columns (e.g., left shifted or right shifted) of the input data to the 3×3 convolver unit, allowing the 3×3 convolver unit access to the 3×3 block of data that spatially corresponds to a particular quadrant of the weights from the 5×5 kernel.

In one embodiment of the invention, zero padding columns are implemented by setting certain outputs of the shifter circuit to zero and setting (or hardwiring) the left-three inputs of the left-most convolver unit and the right-three inputs of the right-most convolver unit to zero. Such implementation may encounter issues with providing the input data to one or more of the convolver units (specifically the right-most convolver unit). Such issues may be addressed by using alternative cut lines through the 5×5 kernel.

In one embodiment of the invention, a device includes a shifter circuit, with a plurality of input signals logically numbered from 1 ... N and a plurality of output signals logically numbered from 1 ... N. The shifter circuit is programmable to: (i) right shift the plurality of input signals by a first integer i, such that the output signals i+1 ... N are electrically connected to the input signals 1 ... N−i, respectively, or left shift the plurality of input signals by a second integer j, such that the output signals 1 ... N−j are electrically connected to the input signals j+1 ... N, respectively. The device further includes a plurality of convolver units, including a first and second convolver unit. In the instance that the convolver units are 3×3 convolver units, the integers i and j are both equal to 1. A first group of signals from the plurality of output signals of the shifter circuit may be communicated to the first convolver unit, and a second group of signals from the plurality of output signals of the shifter circuit may be communicated to the second convolver unit.

In one embodiment of the invention, one of the convolver units is configured to compute a first dot product (i.e., first partial sum) based on data generated with the shifter circuit programmed to right shift the plurality of input signals, compute a second dot product (i.e., second partial sum) based on data generated with the shifter circuit programmed to left shift the plurality of input signals, compute a third dot product (i.e., third partial sum) based on data generated with the shifter circuit programmed to right shift the plurality of input signals, and compute a fourth dot product (i.e., fourth partial sum) based on data generated with the shifter circuit programmed to left shift the plurality of input signals. The convolution output may be generated by summing the first through the fourth dot products, optionally with a bias value.

These and other embodiments of the invention are more fully described in association with the drawings below.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Descriptions associated with any one of the figures may be applied to different figures containing like or similar components/steps.

Figure 1:
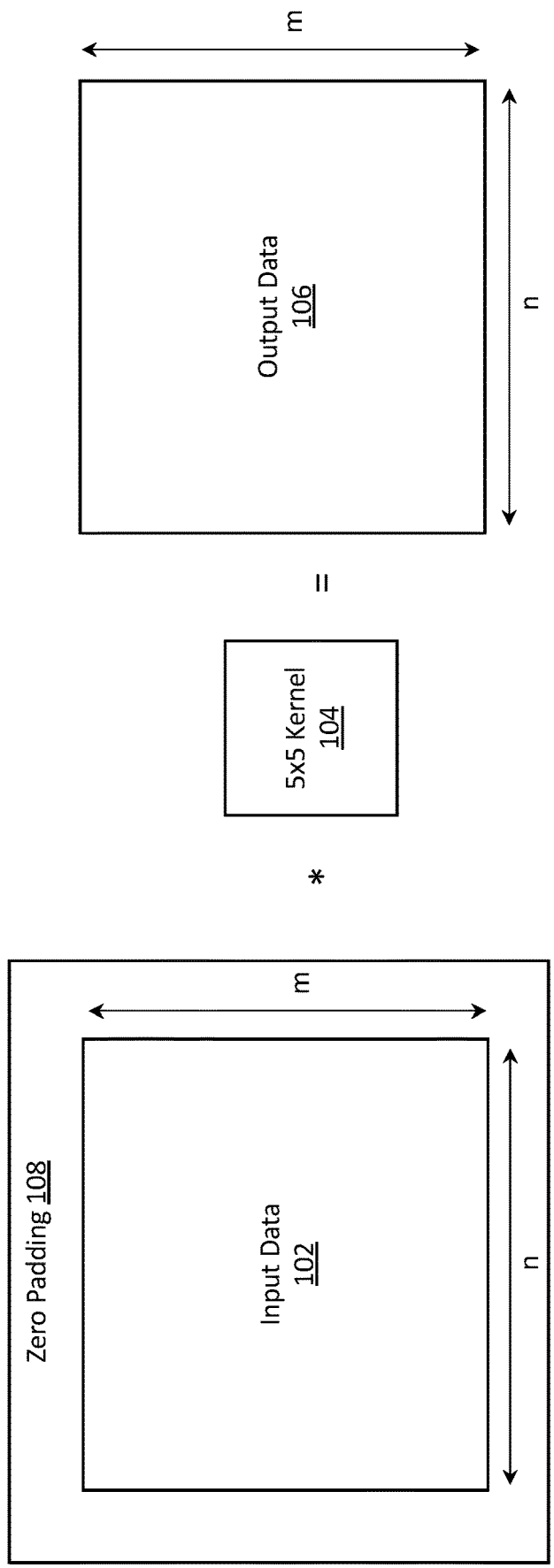
FIG. 1 depicts a block diagram of zero-padded input data being convolved with a 5×5 kernel to generate output data.

FIG. 1 depicts a block diagram of input data 102 with zero padding 108 being convolved with a 5×5 kernel 104 to generate output data 106. For the sake of clarity, it is noted that the "*" operator depicted in FIG. 1 denotes the convolution operator and not the multiplication operator. Input data 102 may have m rows and n columns (or equivalently may be an m by n array). So that the output data 106 also has m rows and n columns, input data 102 may be pre-processed to include zero padding 108. As will be more clearly depicted in the following drawings, for a 5×5 kernel 104, the zero padding 108 may include two rows of zero padding above and below the input data 102 and two columns of zero padding on the left and right of the input data 102. The mathematical computation of convolution is well understood in the art and will not be described in detail herein for the sake of conciseness. Rather, the focus of the present invention is a hardware architecture for performing convolution. While much of the invention will be described in the context of convolution using a 5×5 kernel, it is understood that the techniques described herein can be extended to kernels with larger dimensions (e.g., 7×7 kernel, 9×9 kernel, etc.).

Figure 2A:
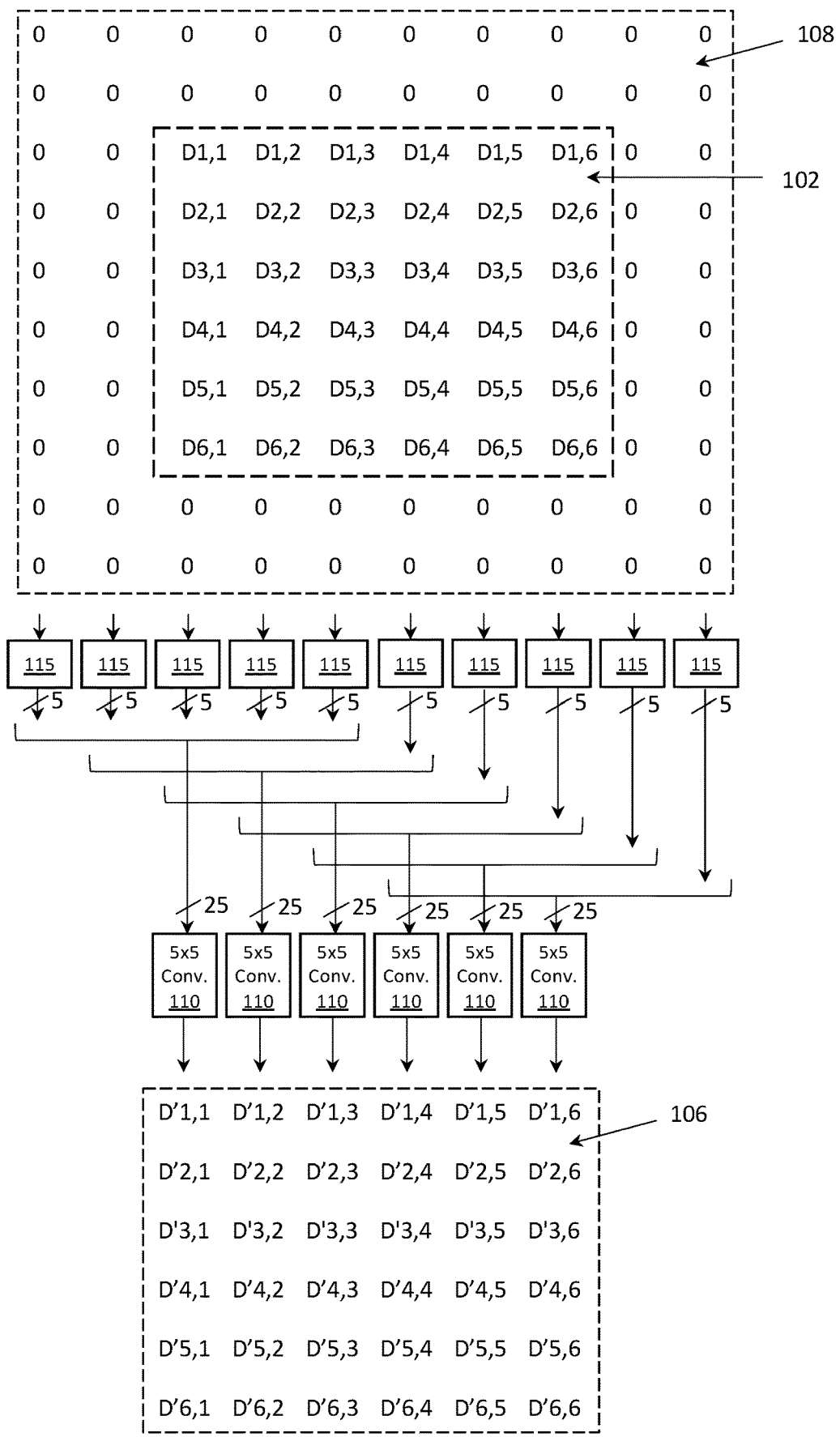
FIG. 2A depicts a block diagram of a plurality of 5×5 convolver units configured to convolve zero-padded input data with a 5×5 kernel.

FIG. 2A depicts a block diagram of a plurality of 5×5 convolver units 110 configured to convolve zero-padded input data (i.e., input data 102 surrounded by zero padding 108) with a 5×5 kernel (not depicted in FIG. 2) in order to generate output data 106. In the present example, the input data 102 has dimensions of 6×6 with 36 total data elements, but it understood that in general the input data dimensions need not have an equal number of rows and columns and could have many more than 36 total data elements. $D_{i,j}$ for $i \in \{1, \ldots, 6\}$ and $j \in \{1, \ldots, 6\}$ are variables that represent the 36 input data elements. The zero padding 108 includes two zero padding rows above and below the input data 102, and two zero padding columns on the left and right of the input data 102, and such number of zero padding rows and columns is chosen based on the dimensions of a 5×5 kernel. More generally, the number of zero padding columns and rows is not a fixed number, but rather is chosen based on the dimensions of the kernel. The output data 106 also has dimensions of 6×6 with 36 total data elements, but could have many more data elements depending on the dimensions of the input data. $D'_{i,j}$ for $i \in \{1, \ldots, 6\}$ and $j \in \{1, \ldots, 6\}$ are variables that represent the 36 output data elements.

The zero-padded input data may be shifted one row at a time into the bank of staging modules 115. As such, one may conceptually visualize the data as "flowing downwards" in the context of FIG. 2A.

Figure 2B:
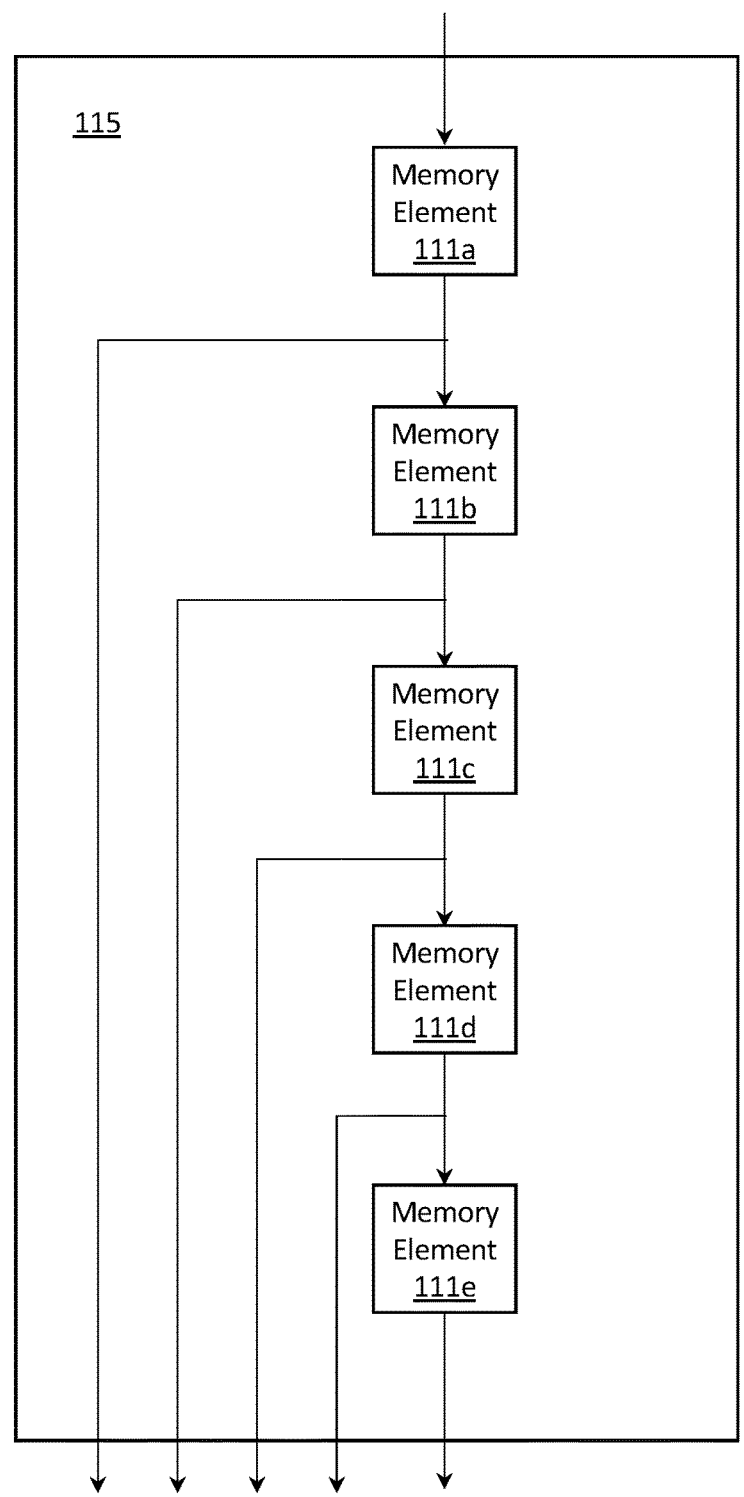
FIG. 2B depicts the hardware architecture of one of the staging modules depicted in FIG. 2A.

Each of the staging modules 115 may be configured to output the five most recent data values during each clock cycle (i.e., most recently received by the staging module). A possible implementation of one of the staging modules 115 is shown in FIG. 2B. Staging module 115 may include five memory elements 111a-111e (e.g., five D flip-flops) connected in series. The output of each of the memory elements 111a-111e may be provided as an output of the staging module 115 during each clock cycle.

Each of the 5×5 convolver units 110 receives a 5×5 block of the input data by sampling the output of five adjacent staging modules 115. Each of the 5×5 convolver units 110 also receives the 25 weights of the 5×5 kernel (such signal lines are not depicted in FIG. 2A for conciseness). With such input, each of the 5×5 convolver units 110 computes a dot product of a 5×5 block of the input data with the 25 weights of the 5×5 kernel to form each of the output data values $D'_{i,j}$. Additional details regarding the functionality of one of the 5×5 convolver units 110 are shown in FIGS. 3A-3C.

Figure 3A:
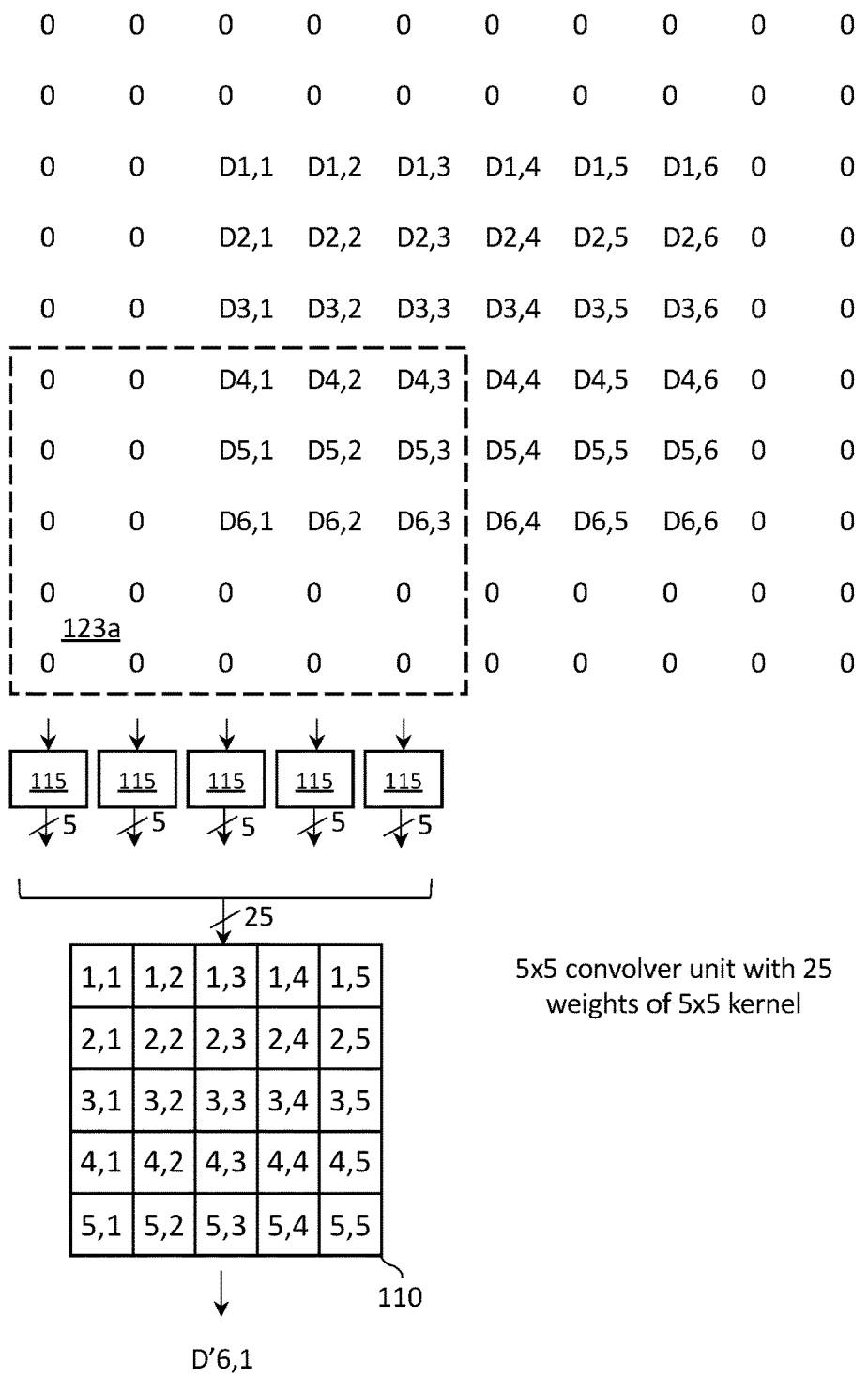
FIGS. 3A-3C depict examples to explain the operation of one of the 5×5 convolver units depicted in FIG. 2A.
Figure 3B:
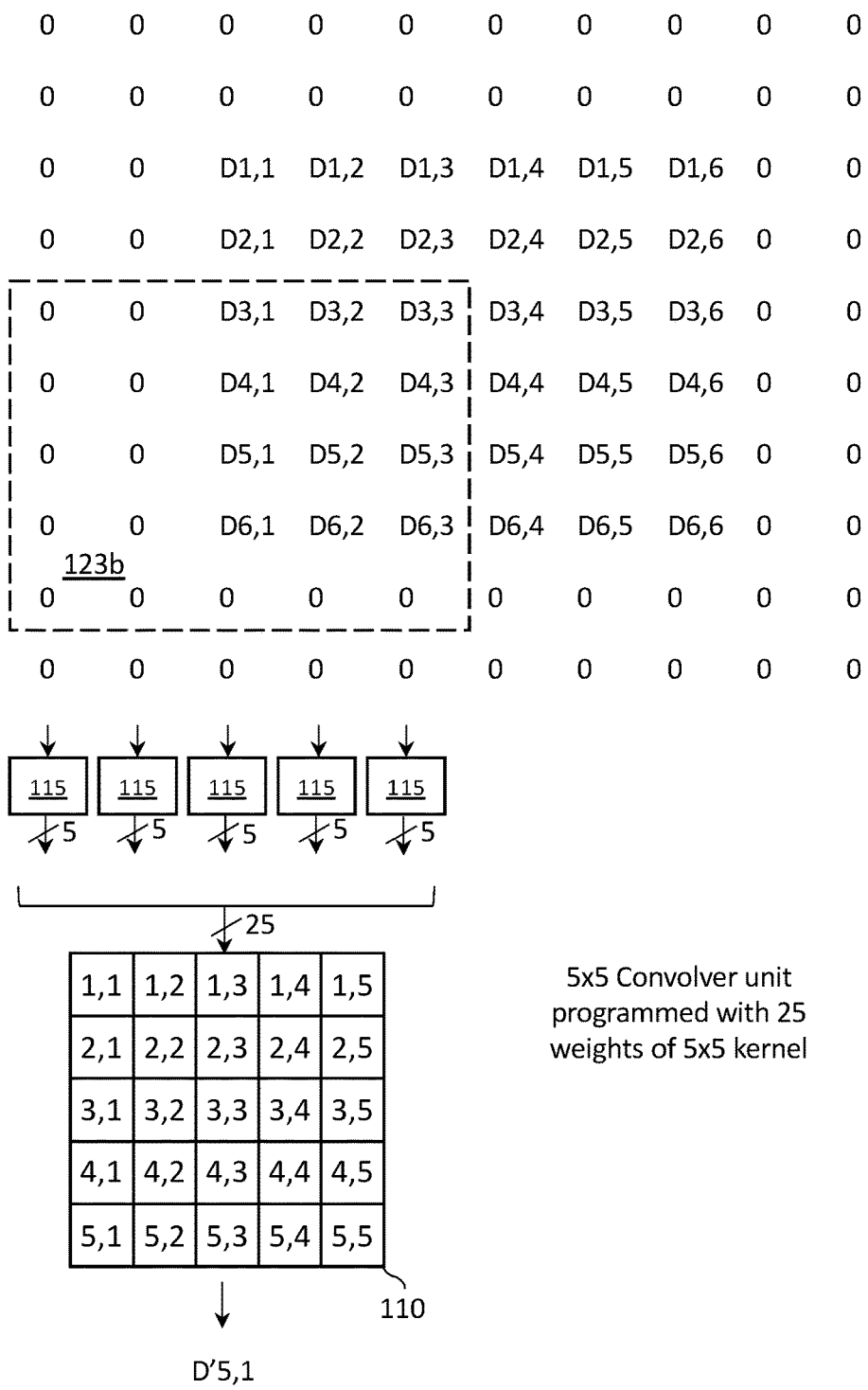
Figure 3C:
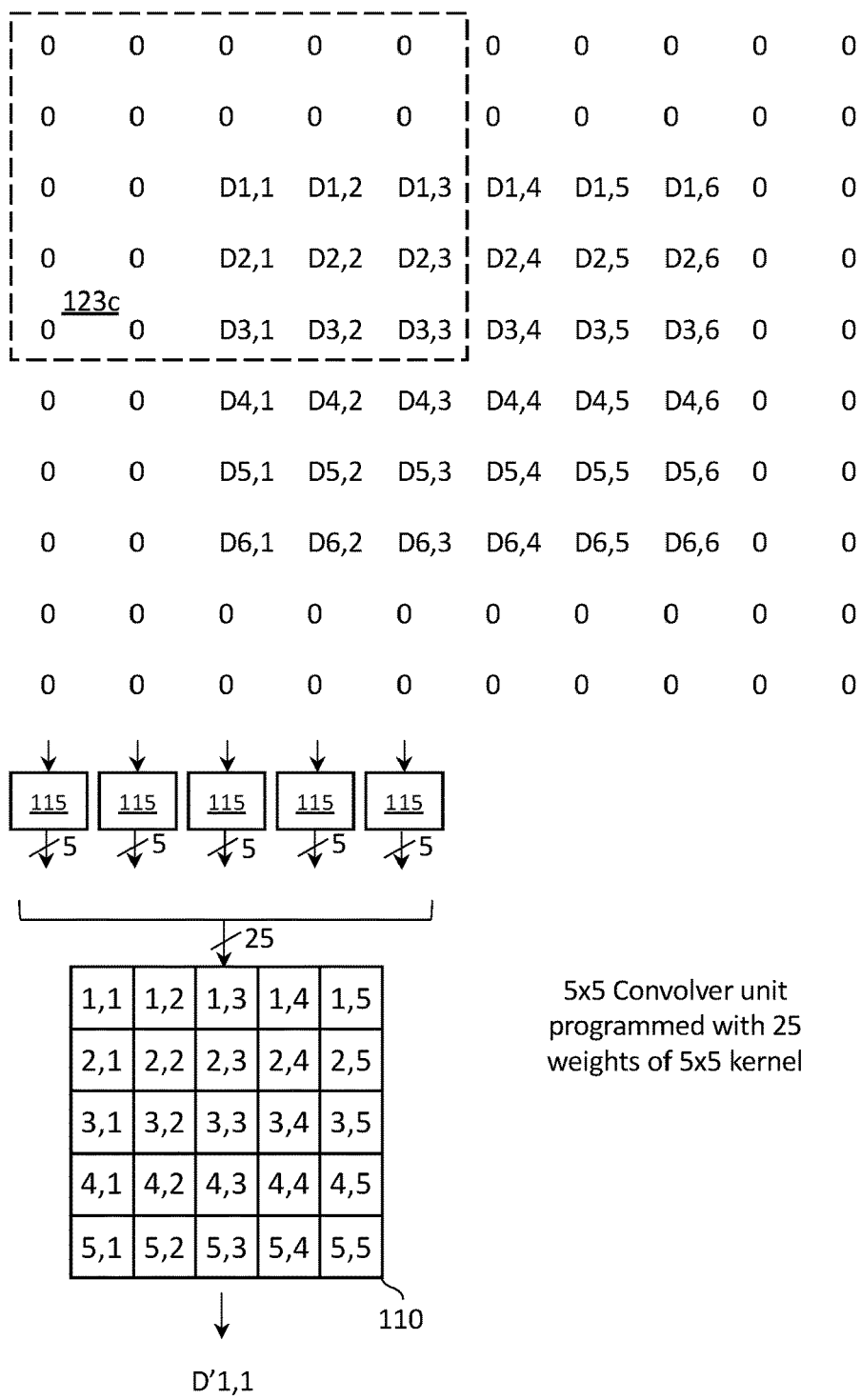

FIGS. 3A-3C depicts the left-most convolver unit 110 that computes dot products based on the first five columns of the zero-padded input data. The 25 weights received by the convolver unit 110 are abstractly represented as 1,1; 1,2; . . . 5,5. Again, signal lines of the 5×5 convolver unit 110 for receiving these 25 weights have not been depicted in FIGS. 3A-3C for conciseness. To clarify, in the nomenclature used herein, variables for data values include the letter "D", whereas variables for weight values (as depicted in the figures) include no letter designation and only include the row, column indices (for ease of illustration). The weight variables are also represented as w1,1; w1,2; w5,5 (i.e., with the letter "w") in the written description.

Conceptually, it should be understood that the zero-padded input data flows from the top of FIG. 3A to the bottom of FIG. 3A, such that convolver unit 110 first receives a 5×5 data block 123a from the bottom five rows (i.e., rows 6-10) of the zero-padded input data (as shown in FIG. 3A) to compute output $D'_{6,1}$; then receives a 5×5 data block 123b from the next five rows (i.e., rows 5-9) of the zero-padded input data (as shown in FIG. 3B) to compute output D' 5,1; then receives other 5×5 data blocks (not depicted) to compute other output; before finally receiving a 5×5 data block 123c from the first five rows (i.e., rows 1-5) of the zero-padded input data (as shown in FIG. 3C) to compute output D'1,1.

For completeness, it is noted that D'6,1 may be computed as follows (in which terms corresponding to zero padding values have been omitted for conciseness since the product of any weight with the number zero is zero):

$D'6,1=w1,3(D4,1)+w1,4(D4,2)+w1,5(D4,3)+w2,3(D5,1)+w2,4(D5,2)+w2,5(D5,3)+w3,3(D6,1)+w3,4(D6,2)+w3,5(D6,3)$

D'5,1 may be computed as follows:

$D'5,1=w1,3(D3,1)+w1,4(D3,2)+w1,5(D3,3)+w2,3(D4,1)+w2,4(D4,2)+w2,5(D4,3)+w3,3(D5,1)+w3,4(D5,2)+w3,5(D5,3)+w4,3(D6,1)+w4,4(D6,2)+w4,5(D6,3)$

D' 1,1 may be computed as follows:

$D'1,1=w3,3(D1,1)+w3,4(D1,2)+w3,5(D1,3)+w4,3(D2,1)+w4,4(D2,2)+w4,5(D2,3)+w5,3(D3,1)+w5,4(D3,2)+w5,5(D3,3)$

Figure 4:
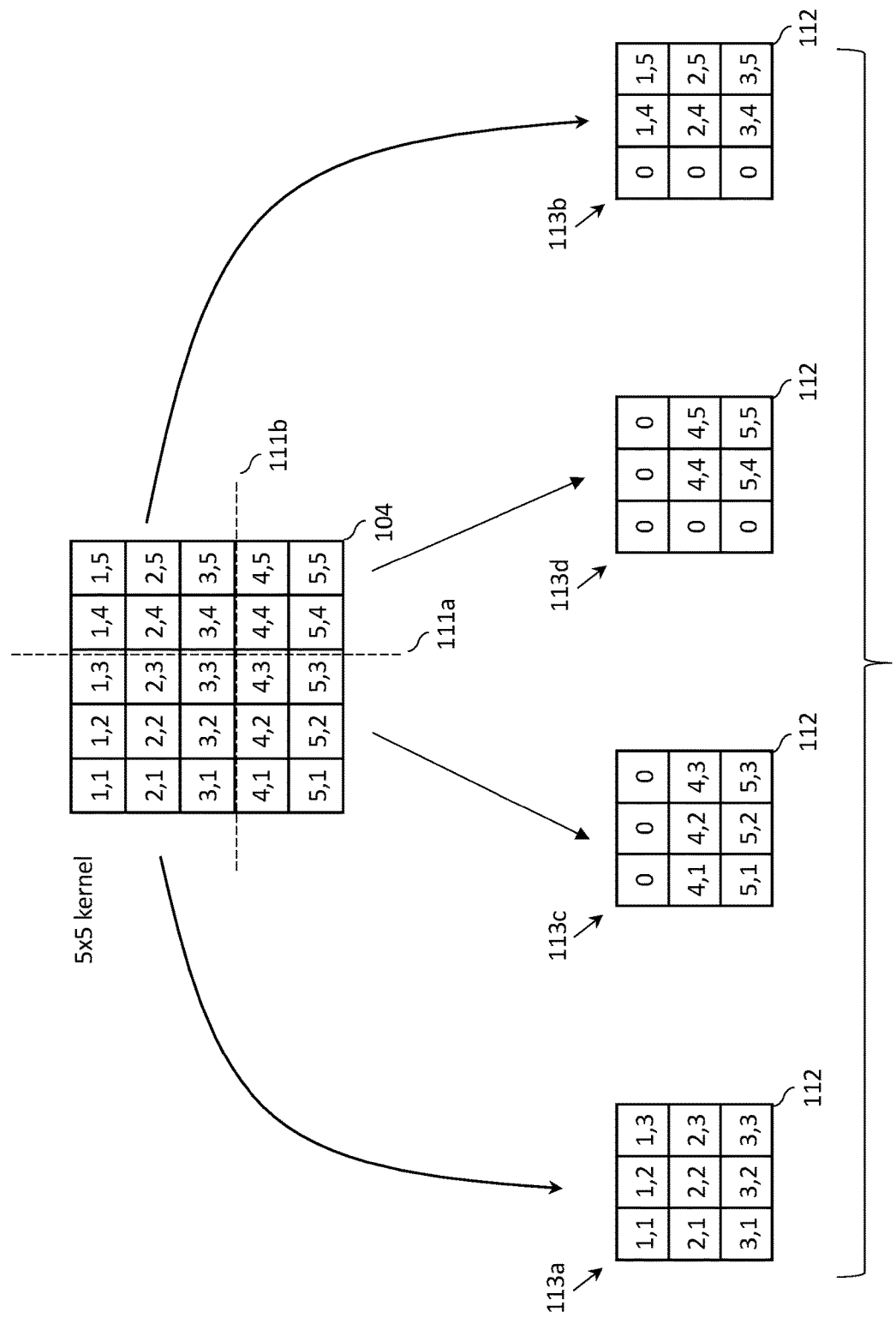
FIG. 4 depicts a diagram that explains how a single 3×3 convolver unit can be used to emulate the functionality of a single 5×5 convolver unit, in accordance with one embodiment of the invention.

FIG. 4 depicts a diagram that explains how a single 3×3 convolver unit 112 can be used to emulate the functionality of a single 5×5 convolver unit 110. Conceptually, the weights of the 5×5 kernel 104 can be partitioned into 4 quadrants by two "cut lines" 111a, 111b, and instead of computing the dot product in a single summation of 25 products, the dot product may be computed by accumulating four partial sums, one for each of the quadrants.

Figure 11:
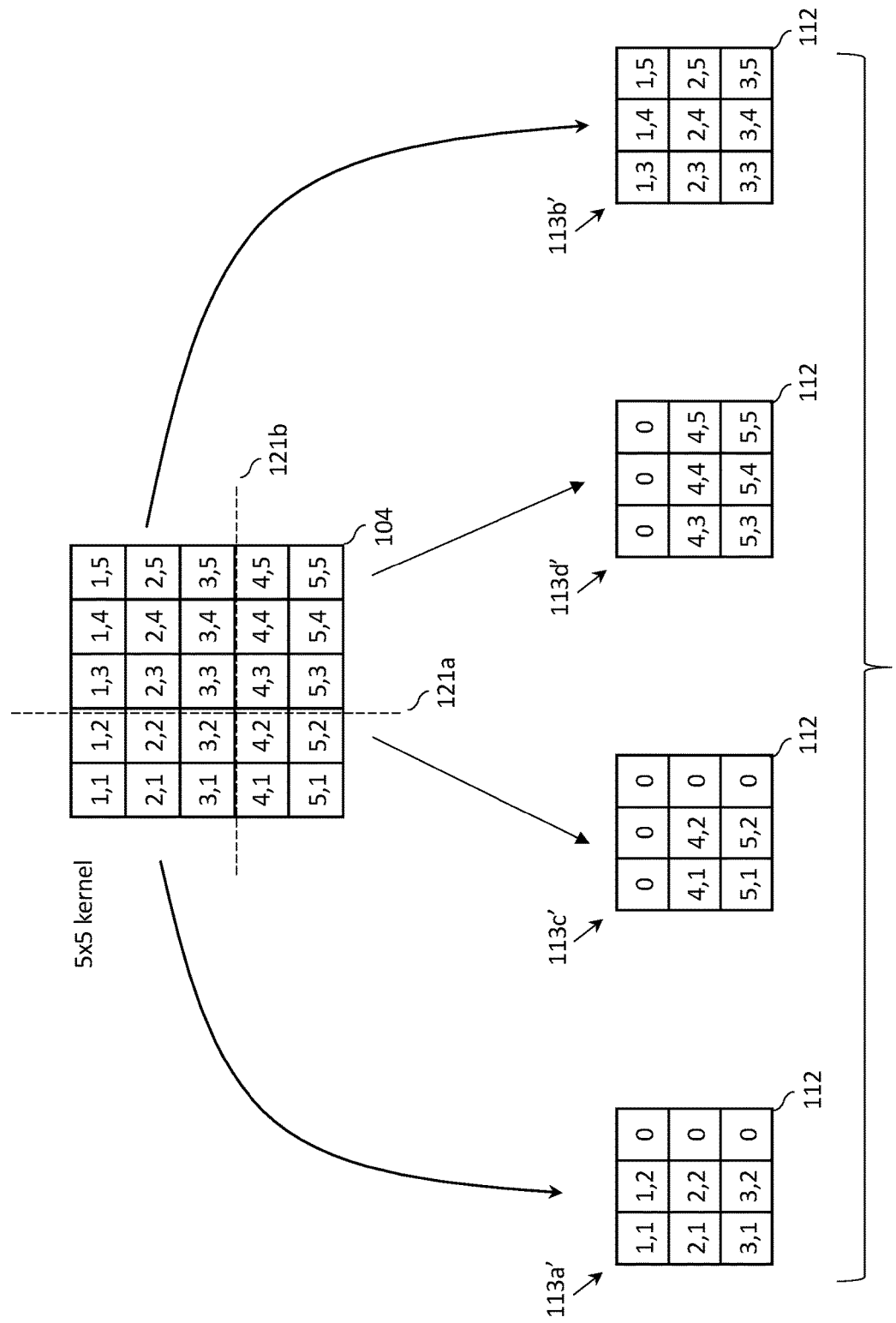
FIG. 11 depicts a diagram that explains how a single 3×3 convolver unit can be used to emulate the functionality of a single 5×5 convolver unit (with a variation of the cut lines depicted in FIG. 4 to overcome the issue described in FIGS. 10A-10D), in accordance with one embodiment of the invention.

More specifically, in a first time period, a 3×3 convolver unit 112 may receive nine weights 113a from the northwest quadrant to generate a first partial sum. In a second time period, the same 3×3 convolver unit 112 may receive nine weights 113b, of which six are from the northeast quadrant and the remaining three are set to zero, to generate a second partial sum. In a third time period, the same 3×3 convolver unit 112 may receive nine weights 113c, of which six are from the southwest quadrant and the remaining three are set to zero, to generate a third partial sum. Finally, in a fourth time period, the same 3×3 convolver unit 112 may receive nine weights 113d, of which four are from the southeast quadrant and the remaining five are set to zero, to generate a fourth partial sum. The four partial sums may be summed together to arrive at the dot product of the 5×5 kernel 104 with a 5×5 block of input data. One possible partition of the 25 weights is shown in FIG. 4, but other partitions are possible as depicted in FIG. 11 below.

Figure 5A:
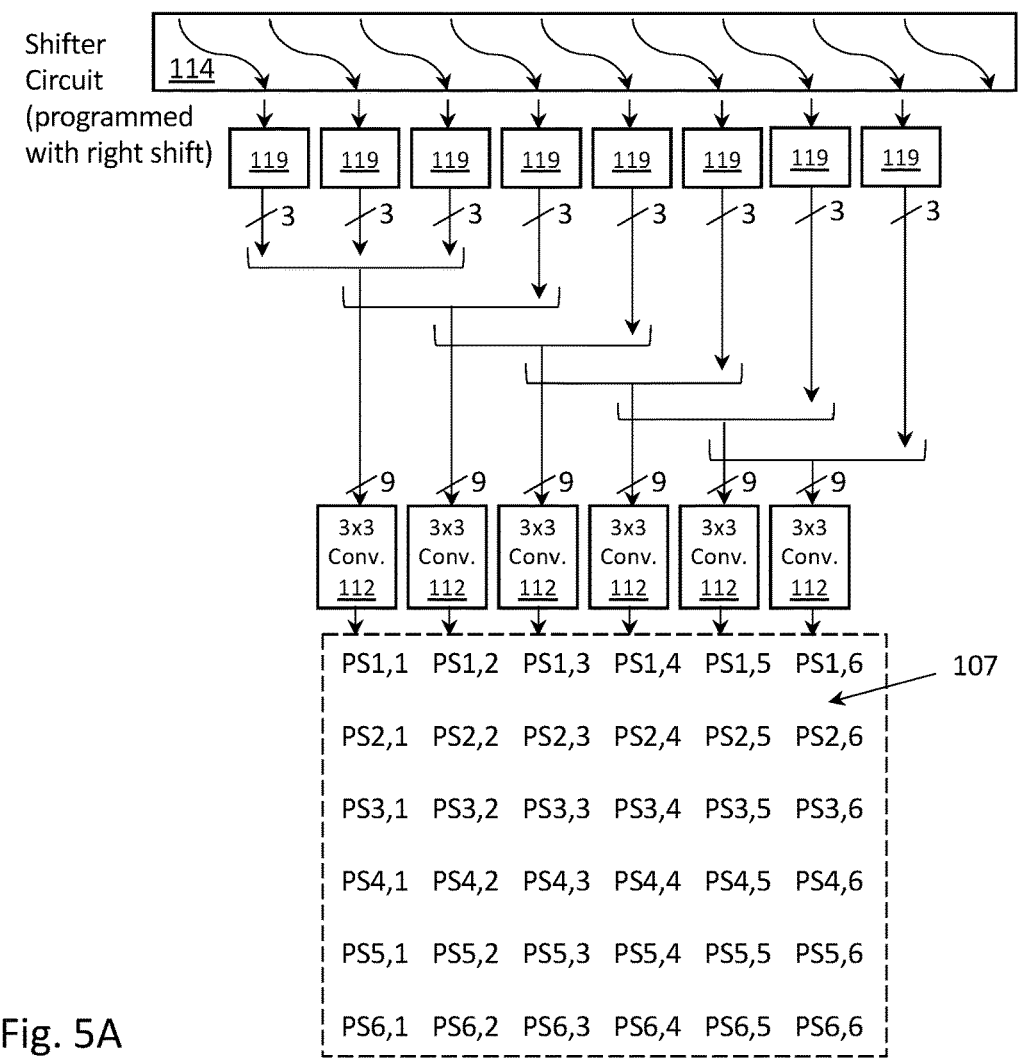
FIGS. 5A-5B depict block diagrams of a device with a shifter circuit and a plurality of 3×3 convolver units configured to convolve zero-padded input data with a 5×5 kernel, in accordance with one embodiment of the invention.
Figure 5B:
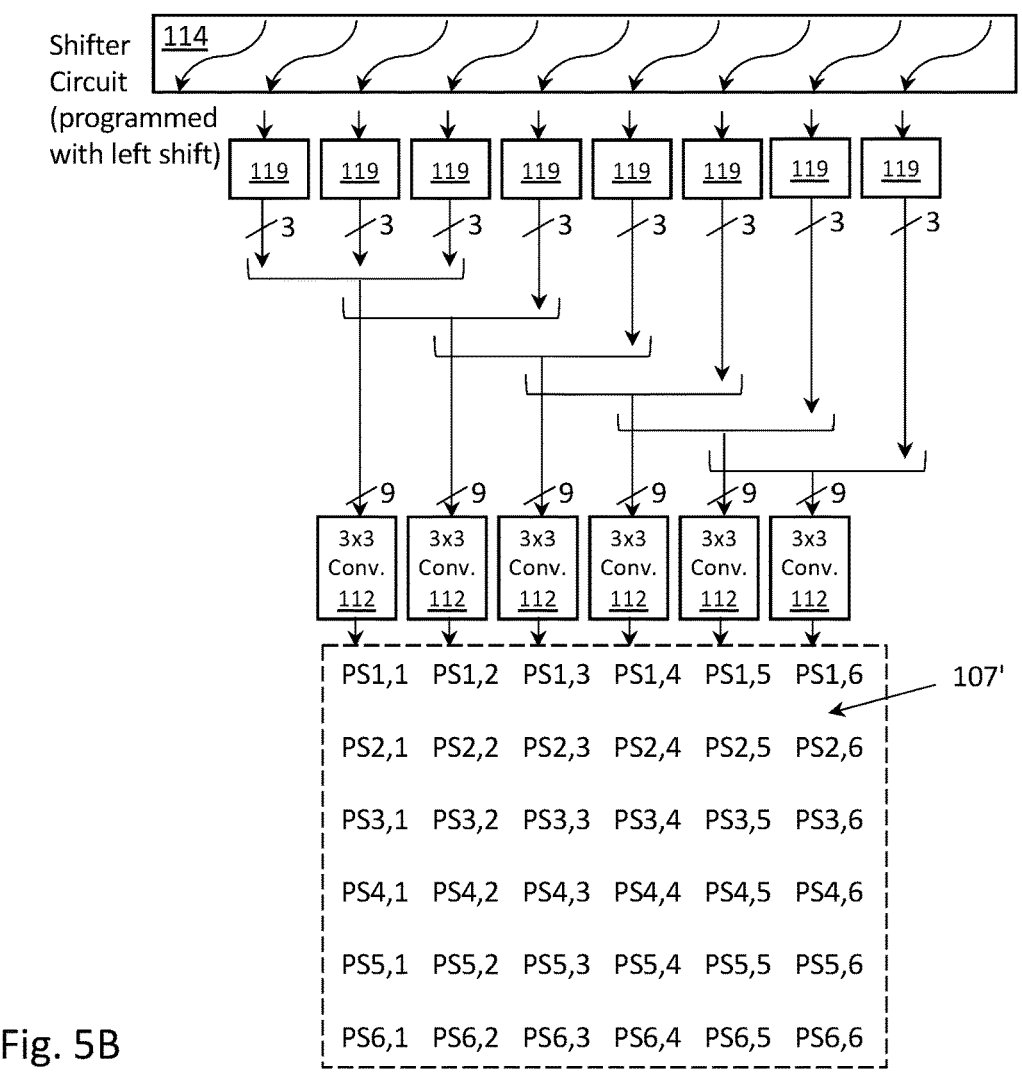
Figure 15:
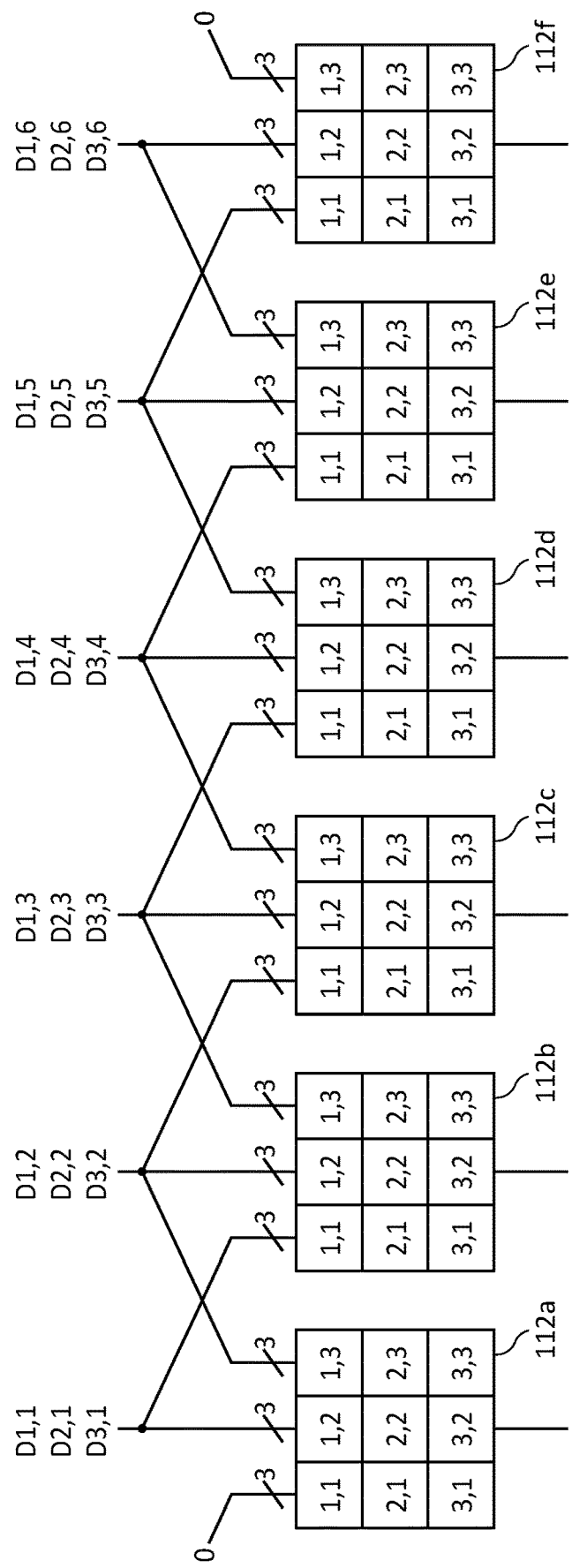
FIG. 15 depicts the device of FIG. 13 configured to convolve input data with a 3×3 kernel, in accordance with one embodiment of the invention.
Figure 18A:
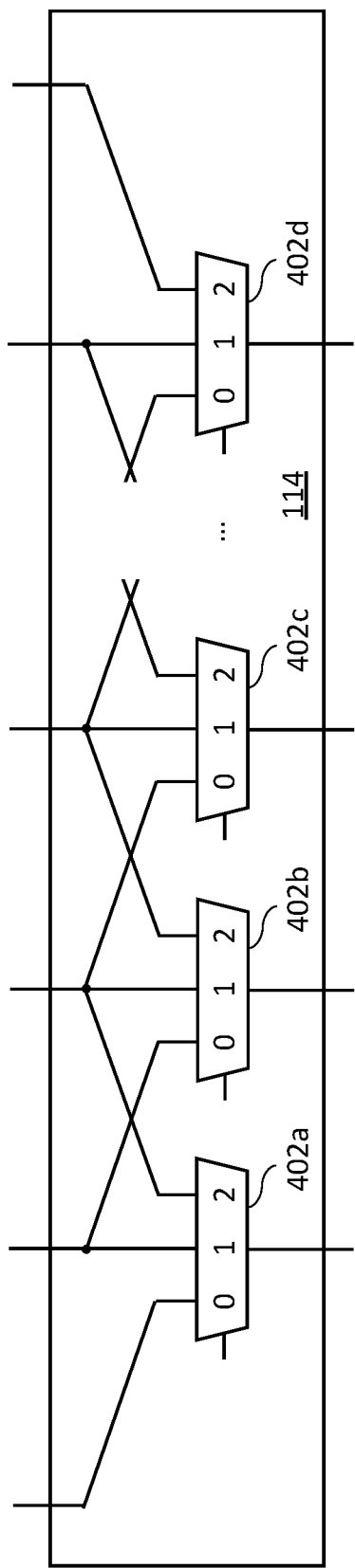
FIGS. 18A-18B each depicts a shifter circuit, in accordance with one embodiment of the present invention.

FIGS. 5A-5B depict block diagrams of a device (i.e., with a shifter circuit 114, a bank of staging modules 119, and a plurality of 3×3 convolver units 112) configured to convolve zero-padded input data with a 5×5 kernel 104. The zero-padded input data is shifted row-by-row into the shifter circuit 114 (i.e., one can imagine the zero-padded input data flowing in the "downwards" direction in the orientation in which it is displayed in FIGS. 5A-5B). The shifter circuit 114 may be programmed to shift the columns of data one to the right (as depicted in FIG. 5A), shift the columns of data one to the left (as depicted in FIG. 5B) or to pass the columns of data through without any shifting (as depicted in FIG. 15 below). As depicted in FIG. 18A, the construction of the shifter circuit 114 may include a plurality of multiplexors 402a, 402b, 402c, 402d, each with three selectable inputs. As the shifter circuit 114 may be purely a combinatorial circuit without any storage elements, once a row of data values are received, the data values may be output in a right-shift, left-shift or unshifted orientation in the same clock cycle.

Figure 6A:
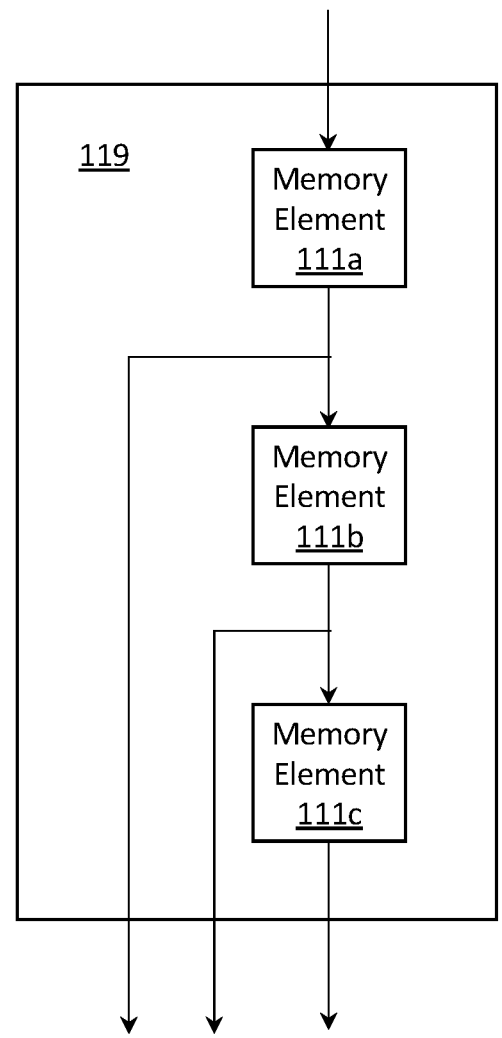
FIG. 6A depicts the hardware architecture of one of the staging modules depicted in FIGS. 5A-5B.

Each of the staging modules 119 may be configured to output the three most recent data values during each clock cycle (i.e., most recently received by the respective staging modules 119). One possible implementation of one of the staging modules 119 is shown in FIG. 6A. Staging module 119 may include three memory elements 111a-111c (e.g., three D flip-flops) connected in series. The output of each of the memory elements 111a-111c may be provided as an output of the staging module 119 during each clock cycle.

Each of the 3×3 convolver units 112 receives a 3×3 block of the zero-padded input data by sampling the output of three adjacent staging modules 119. Each of the 3×3 convolver units 112 also receives nine weights (such signal lines are not depicted in FIGS. 5A-5B for conciseness). With such input, each of the 3×3 convolver units 112 computes a dot product of a 3×3 block of the zero-padded input data with the nine weights to form a partial sum.

As depicted in FIG. 5A, an array of partial sums 107 is generated by the 3×3 convolver units 112 with the shifter circuit 114 programmed with the right shift. The array of partial sums 107 is generated as a result of shifting the entire zero-padded input row-by-row through the shifter circuit 114, providing 3×3 data blocks from the staging modules 119 to the convolver units 112, and computing dot products by the convolver units 112 between various 3×3 data blocks and one set of nine weights populated to all of the convolver units 112. This set of nine weights may correspond to the above-described weights 113a or 113c.

As depicted in FIG. 5B, an array of partial sums 107' is generated by the 3×3 convolver units 112 with the shifter circuit 114 programmed with the left shift. The array of partial sums 107' is generated as a result of shifting the entire zero-padded input row-by-row through the shifter circuit 114, providing 3×3 data blocks from the staging modules 119 to the convolver units 112, and computing dot products by the convolver units 112 between various 3×3 data blocks and one set of nine weights populated to all of the convolver units 112. This set of nine weights may correspond to the above-described weights 113b or 113d. For clarity, it is noted that the partial sums included in array 107 and the partial sums included in array 107' do not have the same values. The same partial sum variables are being used in array 107 and 107' for ease of depiction.

While only two arrays of partial sums have been depicted, it is understood that four arrays of partial sums are generated by the 3×3 convolver units 112 (one array corresponding to each of the above-described weights 113a-113d) and summed together (in an element-wise manner) to generate the output data values representing the convolution of a 5×5 kernel 104 with the zero-padded input data. Additional details of each of the 3×3 convolver units 112 are now provided.

Figure 6B:
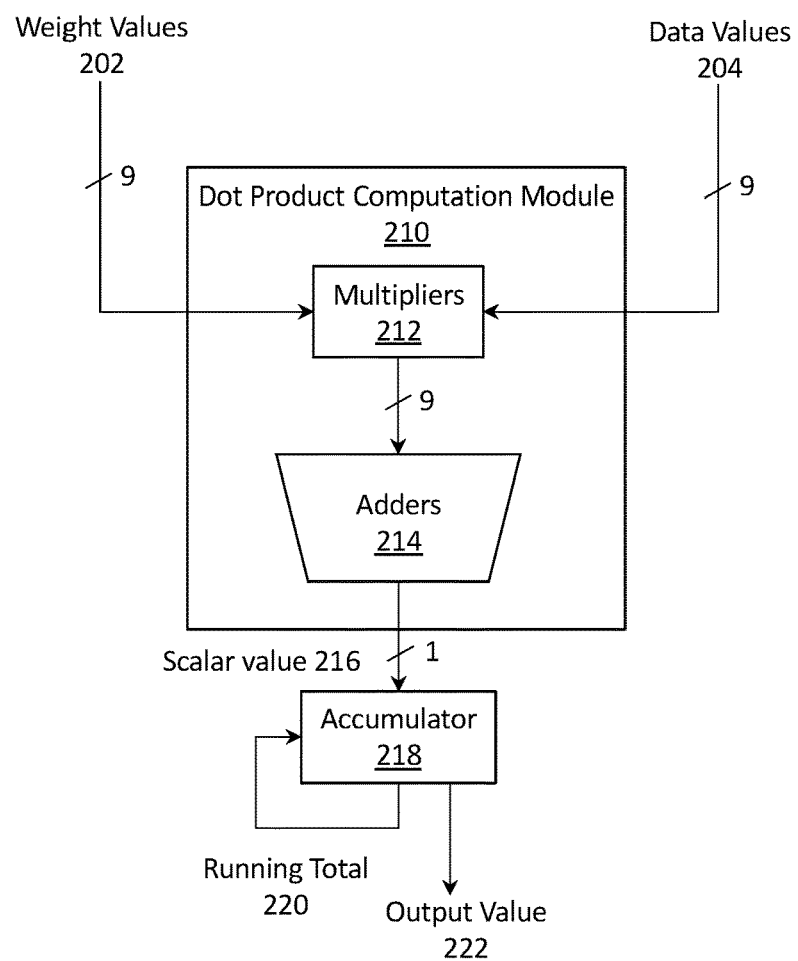
FIG. 6B depicts the hardware architecture of a 3×3 convolver unit, in accordance with one embodiment of the invention.

FIG. 6B depicts the hardware architecture of a 3×3 convolver unit 112, which receives nine weight values 202 and nine data values 204 as input. In the dot product computation module 210, the nine weight values 202 and nine data values 204 may be multiplied in an element-wise manner by multipliers 212 before the nine products are summed by an adder 214 to generate a scalar value 216 representing the dot product of the nine weight values 202 and nine data values 204. An accumulator 218 may accumulate a plurality of these scalar values 216 (also called partial sums) in a running total 220, and output the running total 220 as an output value 222 at a desired time (e.g., when the four partial sums have been aggregated). In another embodiment, each of the partial sums may be stored in memory elements external to the convolver unit 112, and the sum of the partial sums may be performed by an accumulator external to the convolver unit 112.

Figure 6C:
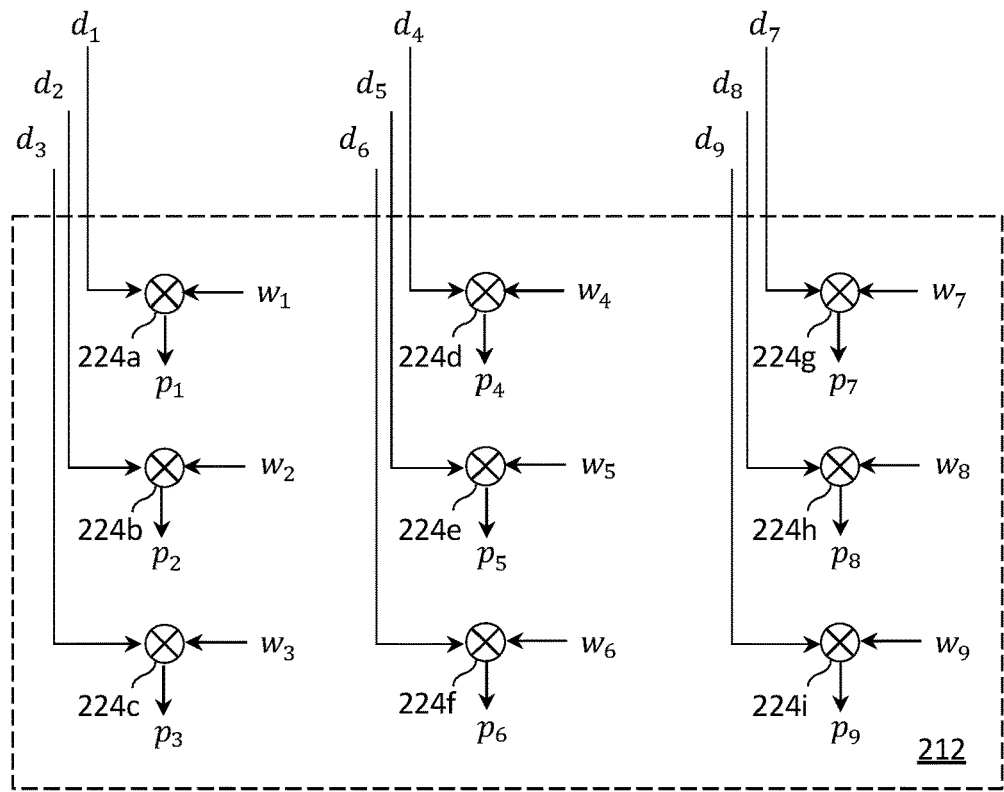
FIG. 6C depicts the hardware architecture of the multipliers and adders depicted in FIG. 6B, in accordance with one embodiment of the invention.
Figure 6C:
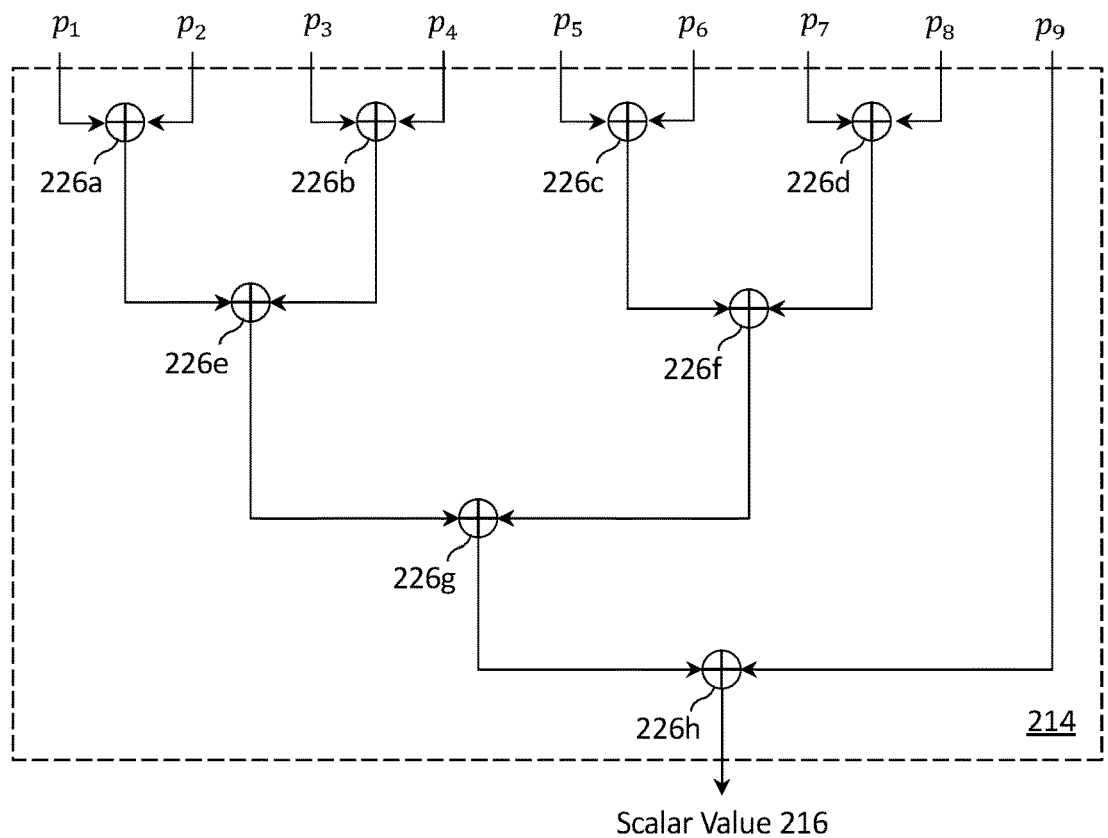

As shown in FIG. 6C, the multipliers 212 may be implemented as nine multipliers 224a-224i, each of which receives a data value $d_i$ and a weight value $w_i$ and computes a product $p_i$ by multiplying the data value $d_i$ with the weight value $w_i$. As further shown in FIG. 6C, the adder 214 may be implemented as an adder tree with eight adders 226a-226h to compute the sum 216 of the nine products, $p_1$ through $p_9$. For the sake of brevity, the schematic of the 3×3 convolver unit 112 depicted in FIG. 6B does not include the hardware components and signals lines for summing the running total 220 with a bias value, but it is expected that one of ordinary skill in the art would be able to modify the convolver unit 112 to incorporate such functionality.

FIGS. 7A-7D depict an example to explain the operation of the shifter circuit 114 and the left-most 3×3 convolver unit 112 depicted in FIGS. 5A-5B in order to generate the output data value D'1,1 (which is equal to output data value D'1,1 generated in FIG. 3C using the 5×5 convolver unit 110). In a first time period depicted in FIG. 7A, the shifter circuit 114 is programmed with a right shift and provides columns 1-3 of the zero-padded input data to the staging modules 119, which then provides data block 115a to the 3×3 convolver unit 112. Also in the first time period, the 3×3 convolver unit 112 receives the nine weights 113a described in FIG. 4. The 3×3 convolver unit 112 computes a dot product between such nine weights 113a and data block 115a to generate a first partial sum PS(1)1,1.

Figure 7A:
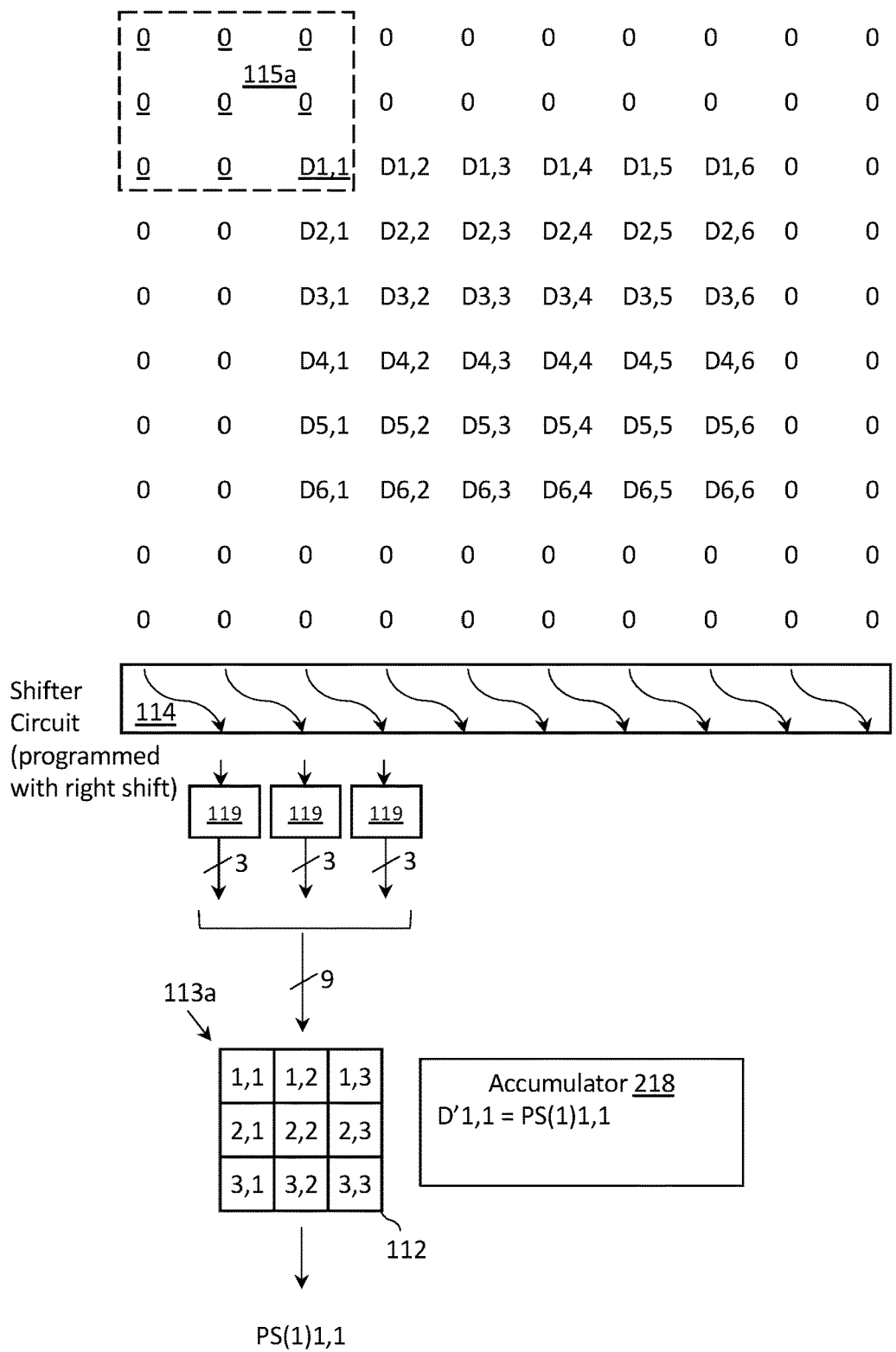
FIGS. 7A-7D depict an example to explain the operation of the shifter circuit and one of the 3×3 convolver units depicted in FIGS. 5A-5B to compute one output data value, in accordance with one embodiment of the invention.

For completeness, the following table provides the correspondence between the data inputs of FIGS. 6C and 7A:

| $d_1 = 0$ | $d_4 = 0$ | $d_7 = 0$ |
| $d_2 = 0$ | $d_5 = 0$ | $d_8 = 0$ |
| $d_3 = 0$ | $d_6 = 0$ | $d_9 = D1,1$ |

Further, the correspondence of the weights between FIGS. 6C and 7A is as follows:

| $w_1 = W1,1$ | $w_4 = W1,2$ | $w_7 = W1,3$ |
| $w_2 = W2,1$ | $w_5 = W2,2$ | $w_8 = W2,3$ |
| $w_3 = W3,1$ | $w_6 = W3,2$ | $w_9 = W3,3$ |

For the sake of clarity in notation, the variables and zero values within the data block 115a that correspond to non-zero weight values are underlined so that it is more easily perceptible to the reader which values from data block 115a can potentially factor into the dot product computation. Such notation will be carried out throughout the remainder of the figures. The accumulator 218 may be initialized with the first partial sum PS(1)1,1.

Figure 7B:
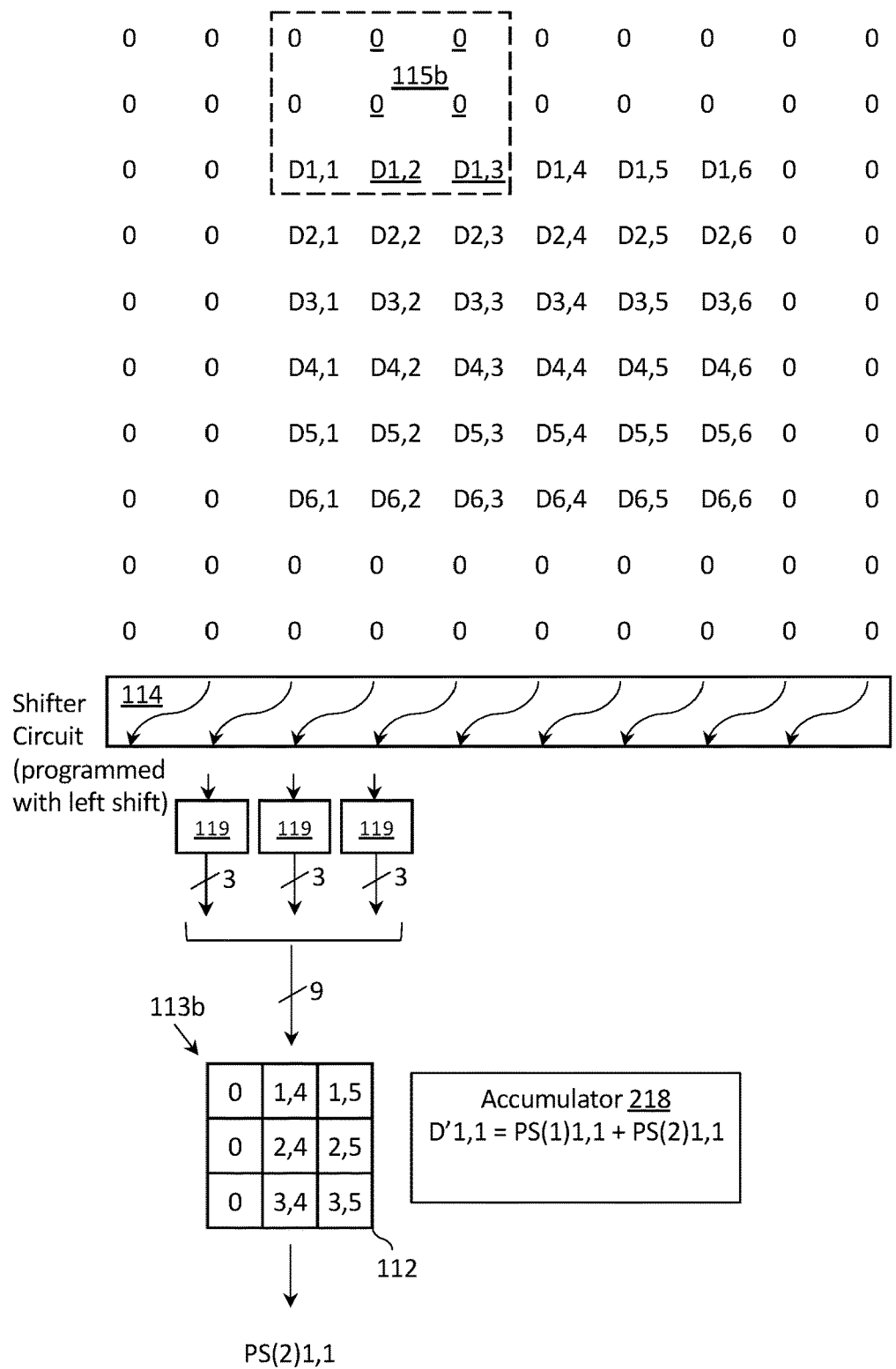

In a second time period as depicted in FIG. 7B, the shifter circuit 114 is programmed with a left shift and provides columns 3-5 of the zero-padded input data to the staging modules 119, which then provides data block 115b to the 3×3 convolver unit 112. Also in the second time period, the 3×3 convolver unit 112 receives the nine weights 113b described in FIG. 4. The 3×3 convolver unit 112 computes a dot product between such nine weights 113b and the data block 115b to generate a second partial sum PS(2)1,1. The accumulator 218 may accumulate the second partial sum PS(2)1,1 with the first partial sum PS(1)1,1 in the running total 220.

For completeness, the following table provides the correspondence between the data inputs of FIGS. 6C and 7B:

| $d_1 = 0$ | $d_4 = 0$ | $d_7 = 0$ |
| $d_2 = 0$ | $d_5 = 0$ | $d_8 = 0$ |
| $d_3 = D1,1$ | $d_6 = D1,2$ | $d_9 = D1,1$ |

Further, the correspondence of the weights between FIGS. 6C and 7B is as follows:

| $w_1 = 0$ | $w_4 = W1,4$ | $w_7 = W1,5$ |
| $w_2 = 0$ | $w_5 = W2,4$ | $w_8 = W2,5$ |
| $w_3 = 0$ | $w_6 = W3,4$ | $w_9 = W3,5$ |

Figure 7C:
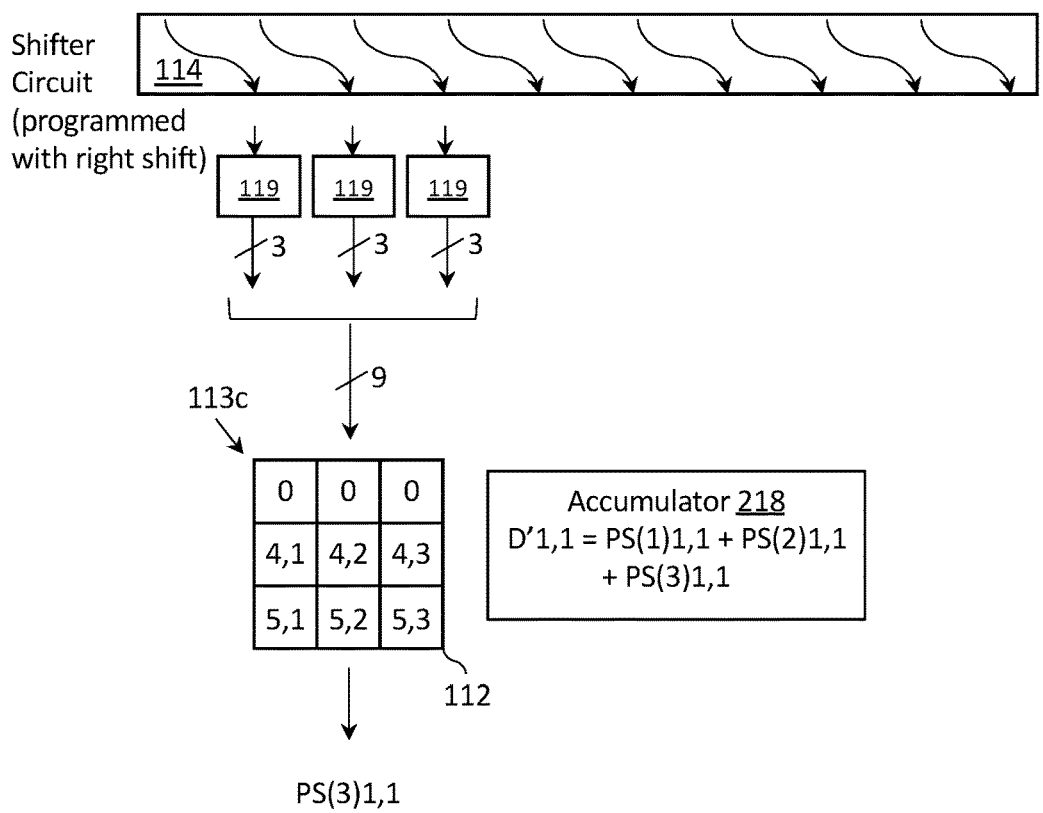

In a third time period as depicted in FIG. 7C, the shifter circuit 114 is programmed with a right shift and provides columns 1-3 of the zero-padded input data to the staging modules 119, which then provides data block 115c to the 3×3 convolver unit 112. Also in the third time period, the 3×3 convolver unit 112 receives the nine weights 113c described in FIG. 4. The 3×3 convolver unit 112 computes a dot product between such nine weights 113c and the data block 115c to generate a third partial sum PS(3)1,1. The accumulator 218 accumulates the three partial sums in the running total 220.

For completeness, the following table provides the correspondence between the data inputs of FIGS. 6C and 7C:

| $d_1 = 0$ | $d_4 = 0$ | $d_7 = D1,1$ |
| $d_2 = 0$ | $d_5 = 0$ | $d_8 = D2,1$ |
| $d_3 = 0$ | $d_6 = 0$ | $d_9 = D3,1$ |

Further, the correspondence of the weights between FIGS. 6C and 7C is as follows:

| $w_1 = 0$ | $w_4 = 0$ | $w_7 = 0$ |
| $w_2 = W4,1$ | $w_5 = W4,2$ | $w_8 = W4,3$ |
| $w_3 = W5,1$ | $w_6 = W5,2$ | $w_9 = W5,3$ |

Figure 7D:
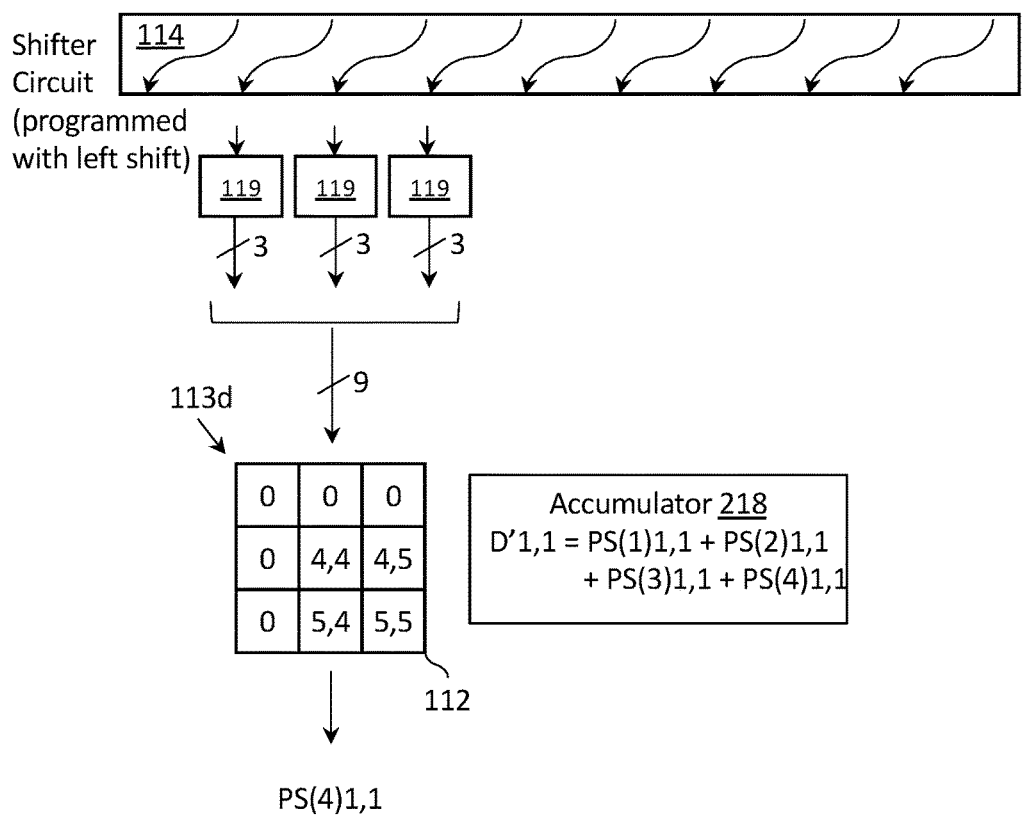

In a fourth time period as depicted in FIG. 7D, the shifter circuit 114 is programmed with a left shift and provides columns 3-5 of the zero-padded input data to the staging modules 119, which then provides data block 115d to the 3×3 convolver unit 112. Also in the fourth time period, the 3×3 convolver unit 112 receives the nine weights 113d described in FIG. 4. The 3×3 convolver unit 112 computes a dot product between such nine weights 113d and the data block 115d to generate a fourth partial sum PS(4)1,1.

For completeness, the following table provides the correspondence between the data inputs of FIGS. 6C and 7D:

| $d_1 = D1,1$ | $d_4 = D1,2$ | $d_7 = D1,3$ |
| $d_2 = D2,1$ | $d_5 = D2,2$ | $d_8 = D2,3$ |
| $d_3 = D3,1$ | $d_6 = D3,2$ | $d_9 = D3,3$ |

Further, the correspondence of the weights between FIGS. 6C and 7D is as follows:

| $w_1 = 0$ | $w_4 = 0$ | $w_7 = 0$ |

| | | |
|---|---|---|
| $w_2 = 0$ | $w_5 = W4,4$ | $w_8 = W4,5$ |
| $w_3 = 0$ | $w_6 = W5,4$ | $w_9 = W5,5$ |

Finally, the accumulator 218 accumulates the four partial sums to arrive at the output data value D'1,1.

Figure 8A:
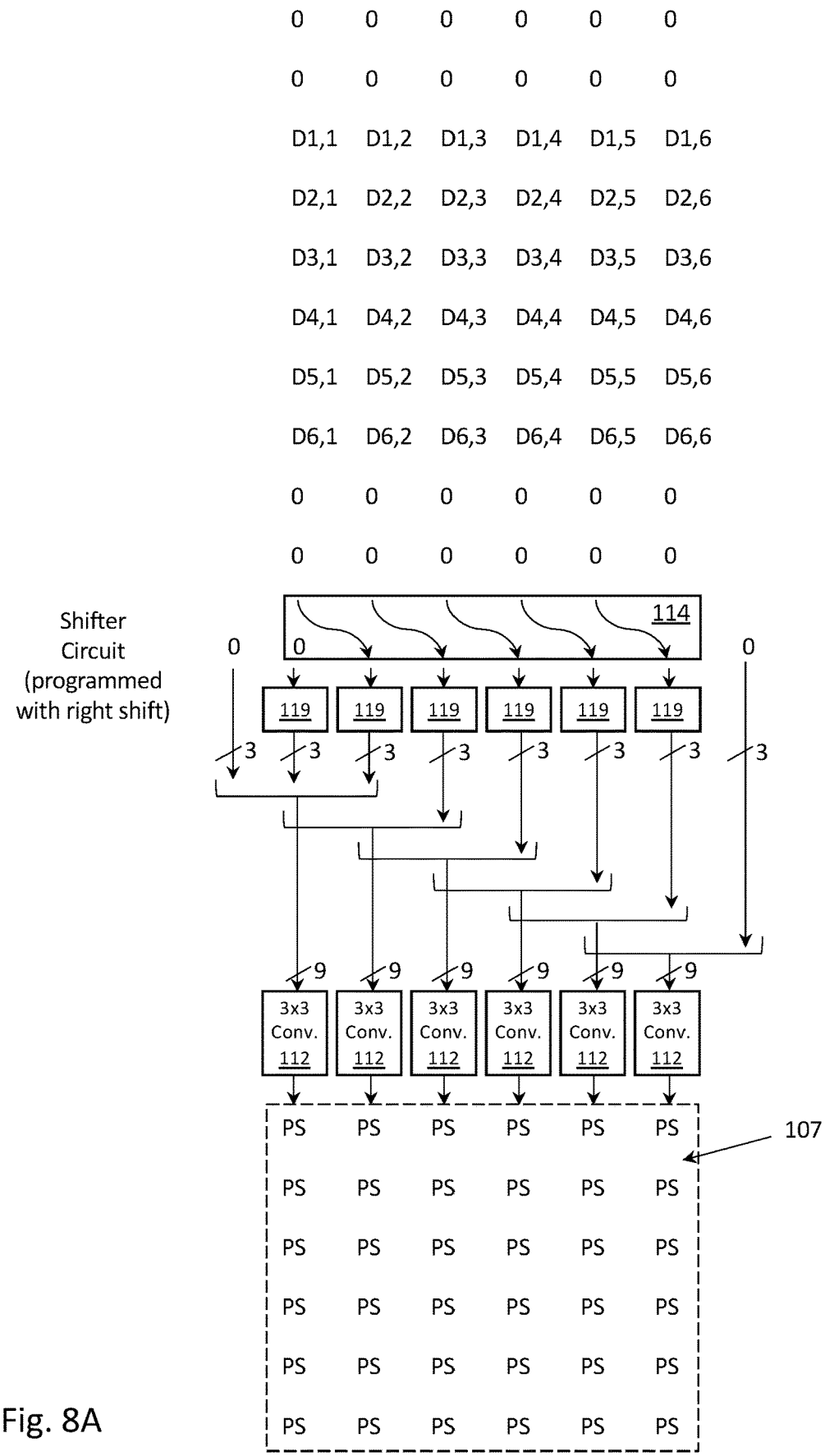
FIGS. 8A-8B depict a block diagram of an optimized version of the device depicted in FIGS. 5A-5B that implicitly accounts for the zero padding columns, in accordance with one embodiment of the invention.
Figure 8B:
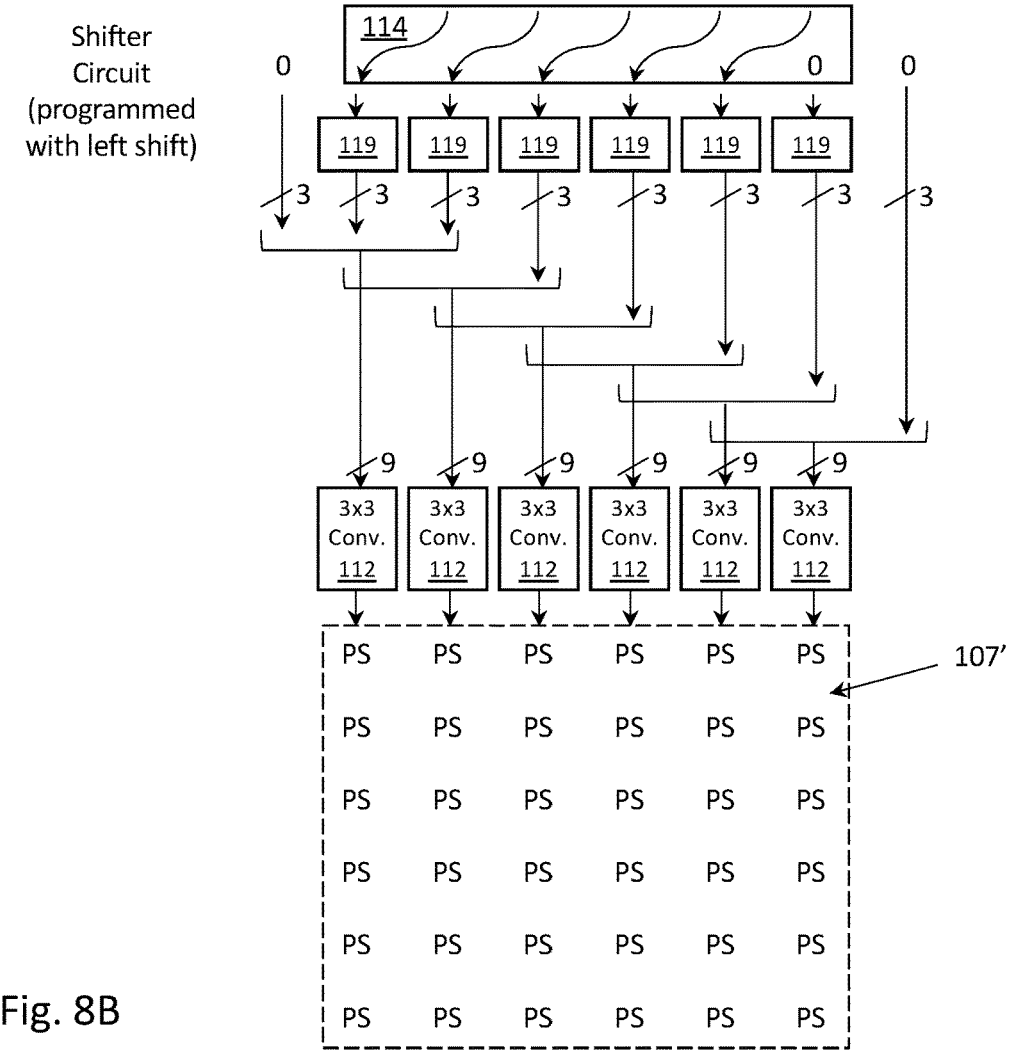
Figure 9A:
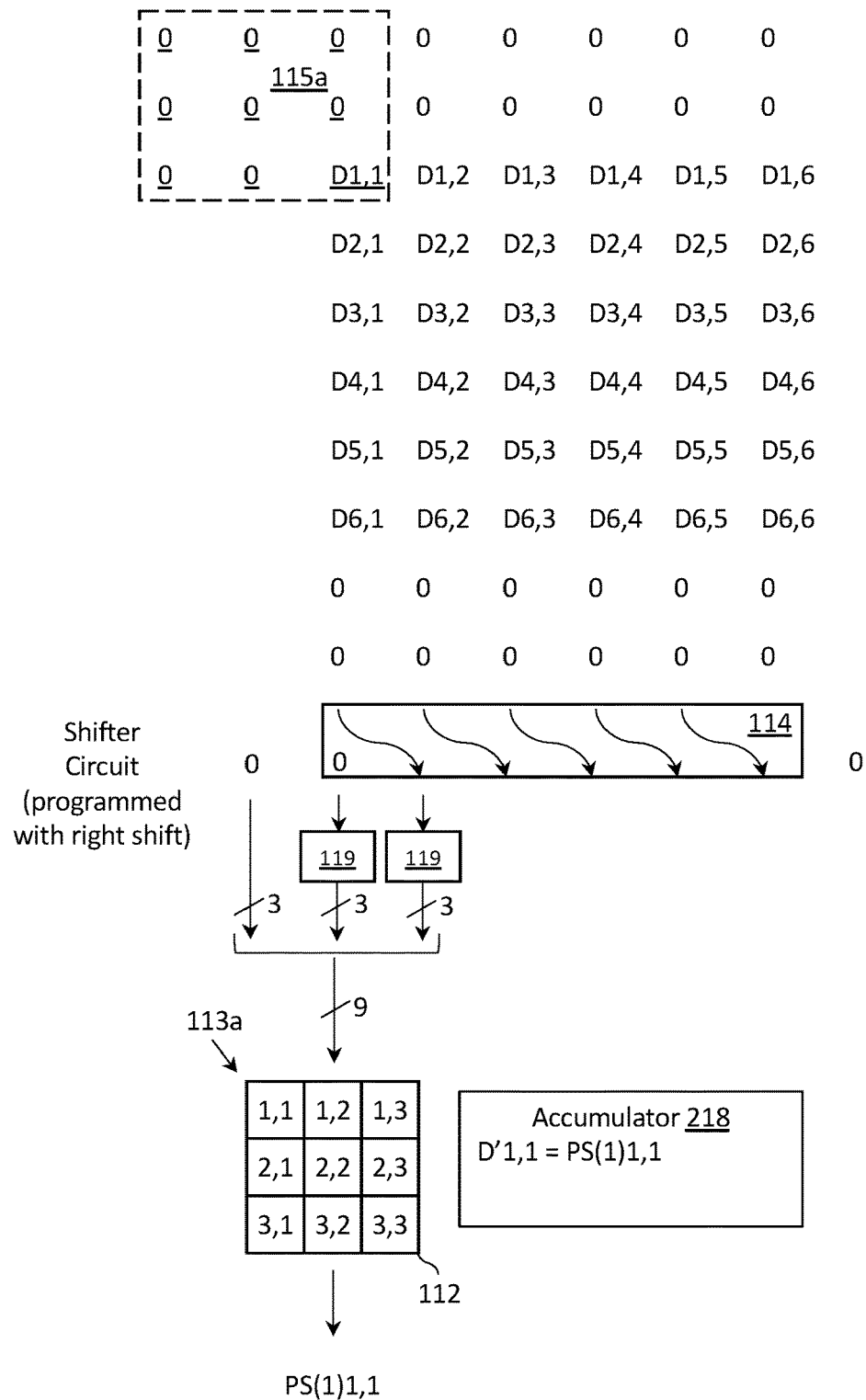
FIGS. 9A-9D depict an example to explain the operation of the shifter circuit and the left most 3×3 convolver unit depicted in FIGS. 8A-8B to compute one output data value, in accordance with one embodiment of the invention.
Figure 9B:
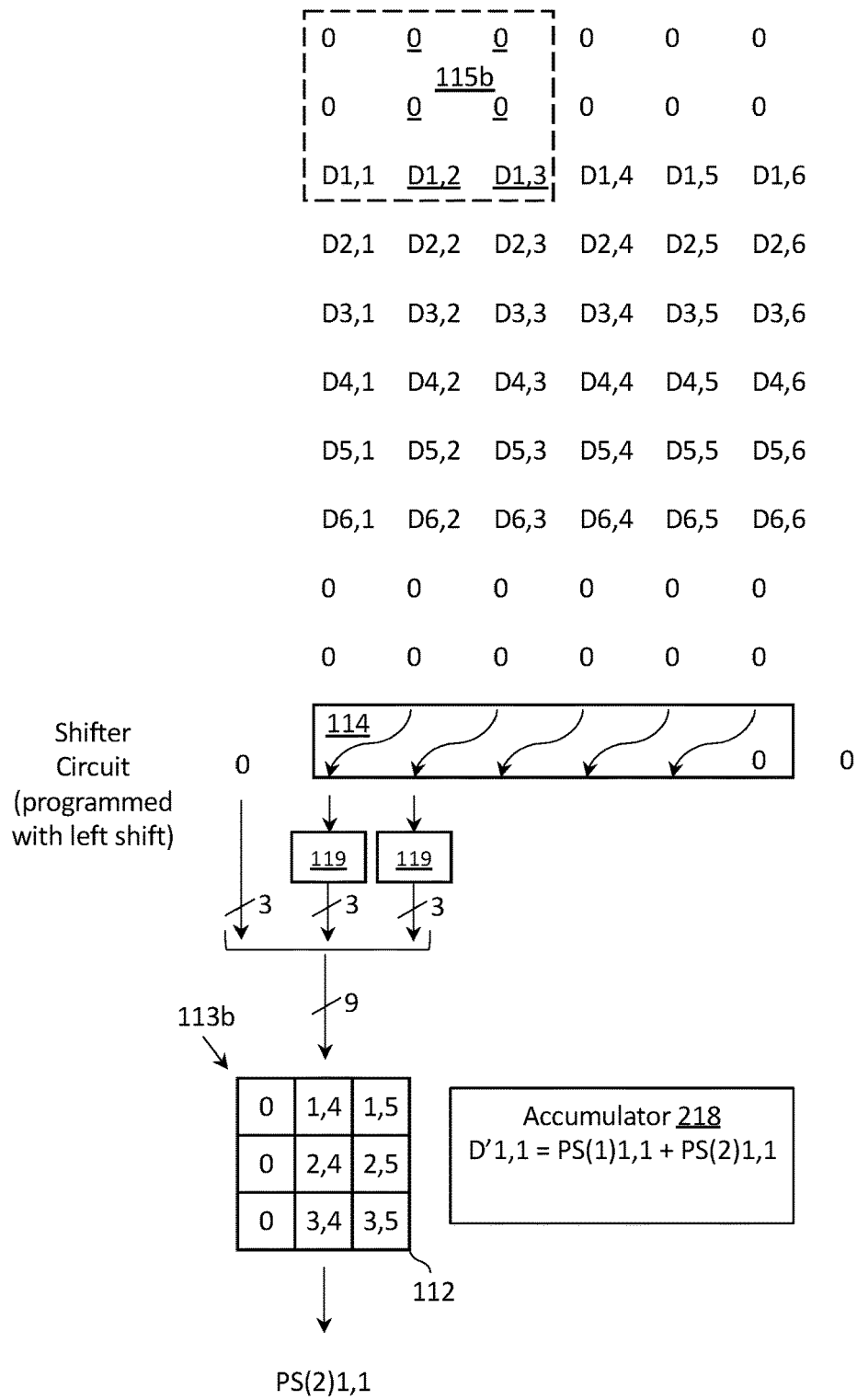
Figure 9C:
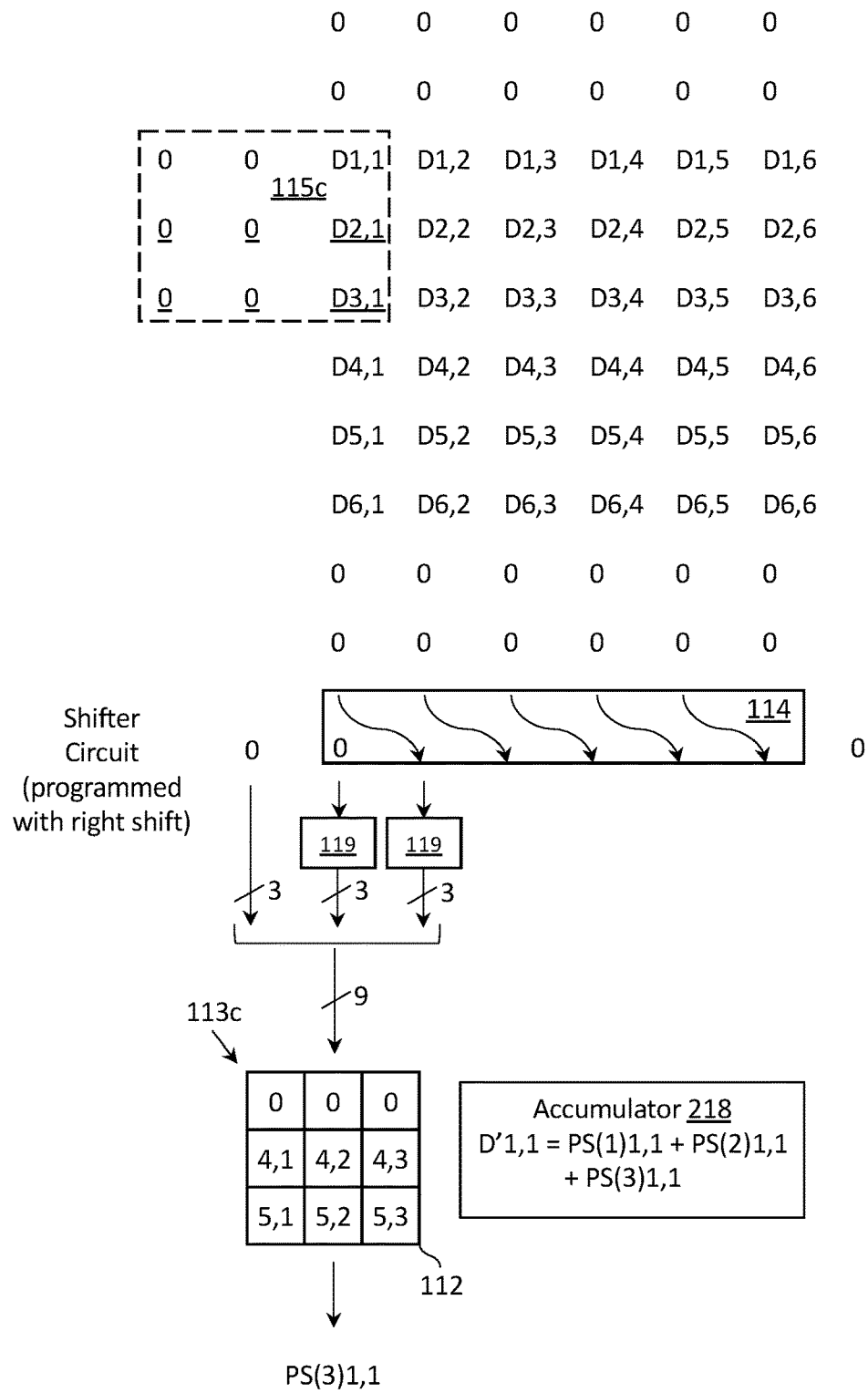
Figure 9D:
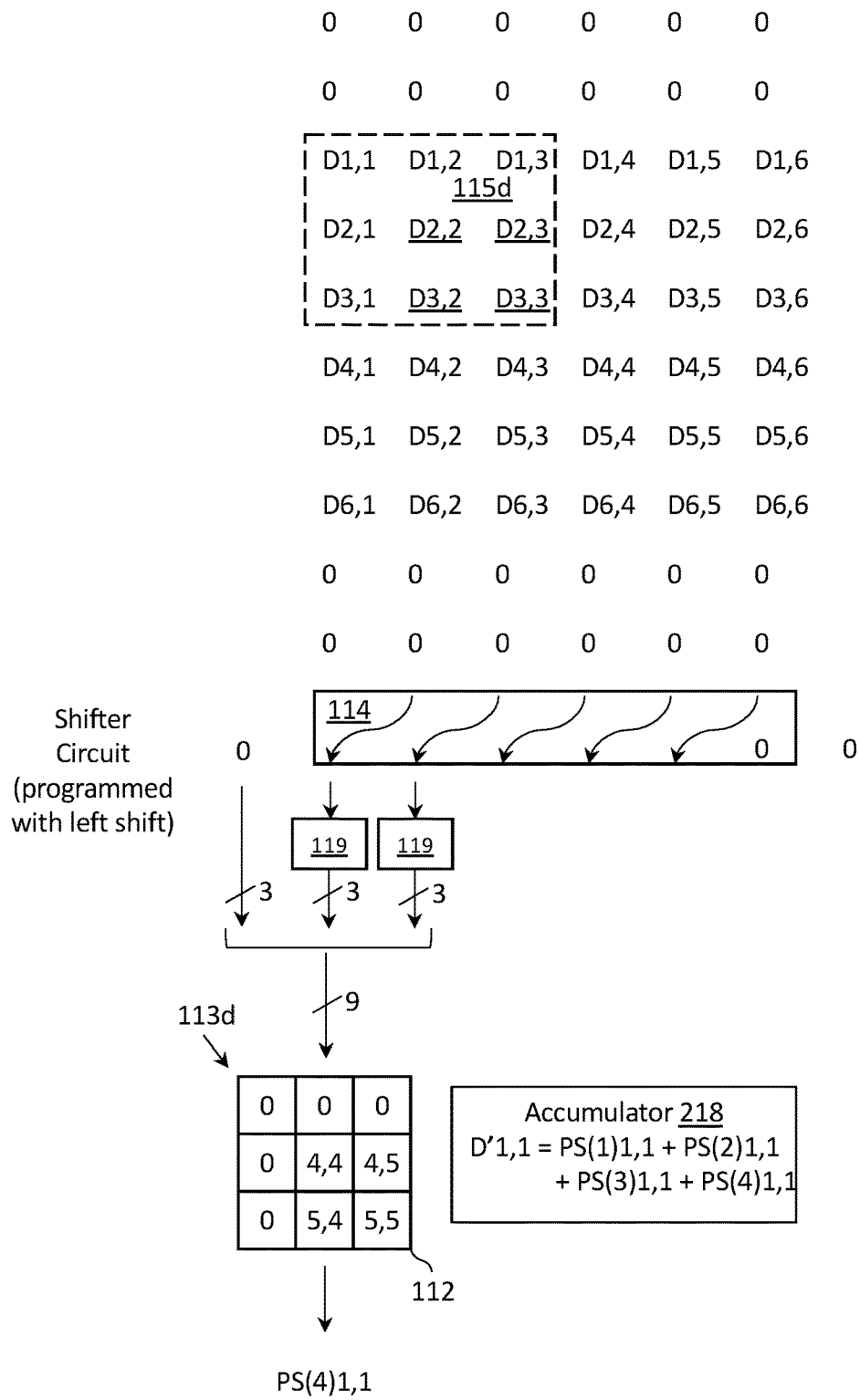

FIGS. 8A-8B depict block diagrams of an optimized version of the device depicted in FIGS. 5A-5B that implicitly accounts for the zero padding columns. In contrast to the embodiment depicted in FIGS. 5A-5B, left and right zero padding columns are not shifted (downwards in the orientation of FIG. 8A) into the shifter circuit 114. Instead, the left-three inputs of the left-most convolver unit 112 and the right-three inputs of the right-most convolver unit 112 are hardwired to zero. For clarity, the "left-three inputs" of a convolver unit refer to data inputs $d_1$, $d_2$, $d_3$ depicted in FIG. 6C, and the "right-three inputs" of a convolver unit refer to data inputs $d_7$, $d_8$, $d_9$ depicted in FIG. 6C.

Figure 18B:
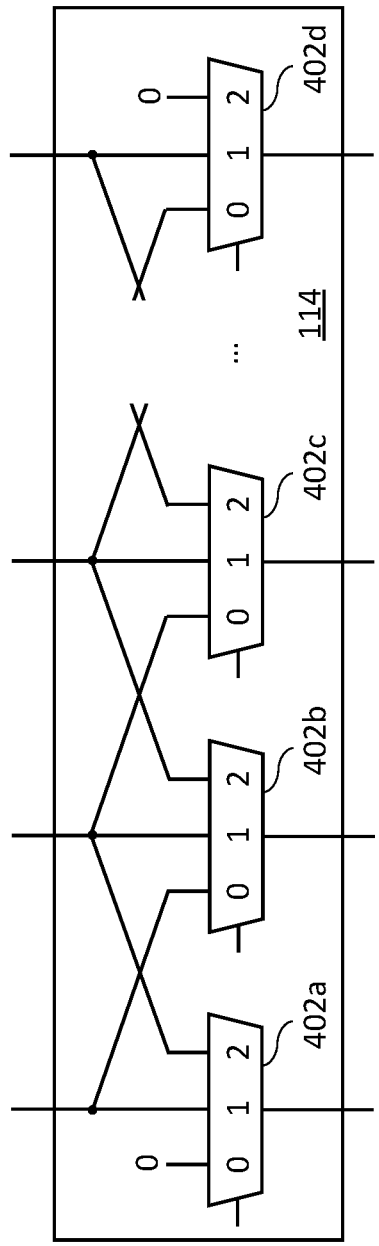

Further, when the shifter circuit 114 is programmed with a right shift, the left-most output of the shifter circuit 114 is set to zero (as depicted in FIG. 8A), and when the shifter circuit 114 is programmed with a left shift, the right-most output of the shifter circuit 114 is set to zero (as depicted in FIG. 8B). With such configuration of the shifter circuit 114 (as depicted in FIG. 18B), the optimized device depicted in FIGS. 8A-8B is able to emulate the functionality of the device depicted in FIGS. 5A-5B with the exception of one issue described in FIGS. 10A-10D below and resolved in FIGS. 11 and 12A-12D. The device of FIGS. 8A-8B is optimized in the sense that it requires less components to implement than the device of FIGS. 5A-5B and thus consumes less power and chip area.

It is noted that in other embodiments with larger sized kernels (e.g., 7×7, 9×9), it may be necessary for the shifter circuit to shift the input data by more than one column. More generally, when the shifter circuit 114 is programmed to right shift the plurality of input signals 1 . . . N of the shifter circuit 114 by i columns (i≥2), the output signals 1 . . . i of the shifter circuit 114 are connected to a zero value. Similarly, when the shifter circuit 114 is programmed to left shift the plurality of input signals 1 . . . N of the shifter circuit 114 by j columns (j≥2), the output signals N−j+1 . . . N of the shifter circuit 114 are connected to a zero value.

FIGS. 9A-9D depict details to explain the operation of the shifter circuit 114 and the left-most 3×3 convolver unit 112 depicted in FIGS. 8A-8B. Through careful inspection, the reader should be able to determine that the partial sums described in FIGS. 9A-9D are identical to those previously described in FIGS. 7A-7D. The only detail that may need some clarification is the illustration of zero values within blocks 115a and 115c which are located in the "implicit" zero padding columns of FIGS. 9A and 9C. To clarify, the zero values that are provided to data inputs $d_1$, $d_2$, $d_3$, $d_4$, $d_5$, $d_6$ (see FIG. 6C) of the left-most 3×3 convolver unit 112 correspond to and conceptually can be represented as zero values in the "implicit" zero padding columns of FIGS. 9A and 9C.

FIGS. 10A-10D depict details to explain the operation of the shifter circuit 114 and the right-most 3×3 convolver unit 112 depicted in FIGS. 8A-8B. The computation of the first partial sum PS(1)1,6 reveals an issue due to the implicit accounting of the zero-padding columns. The right-most 3×3 convolver unit 112 when programmed with the northwest set of weights 113a should perform a dot product with the nine values within block 117a. However, due to the right-three inputs of the right-most convolver unit 112 being hardwired to zero, the right-most column of values within block 117a is not provided to the 3×3 convolver unit 112, leading to an error in the computation of the partial sum PS(1)1,6. To be explicit, the partial sum PS(1)1,6 should be calculated as follows:

$$PS(1)1,6 = w3,1(D1,4) + w3,2(D1,5) + w3,3(D1,6)$$

Figure 10A:
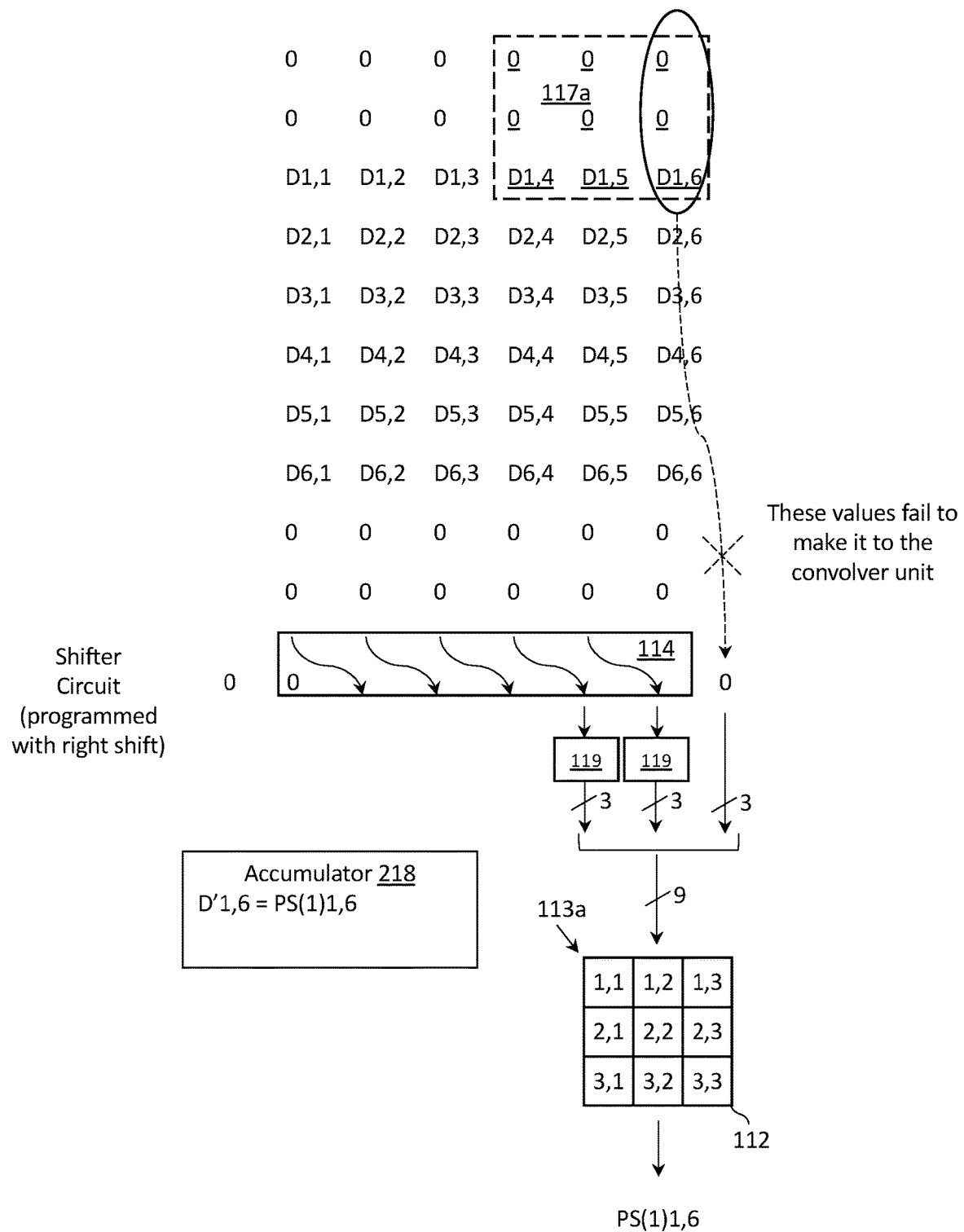
FIGS. 10A-10D depict an example to explain the operation of the shifter circuit and the right most 3×3 convolver unit depicted in FIGS. 8A-8B to compute one output data value (in which an issue is encountered in the operation), in accordance with one embodiment of the invention.

However, with the implementation depicted in FIG. 10A, the partial sum lacks the last term:

$$PS(1)1,6 = w3,1(D1,4) + w3,2(D1,5)$$

Figure 10B:
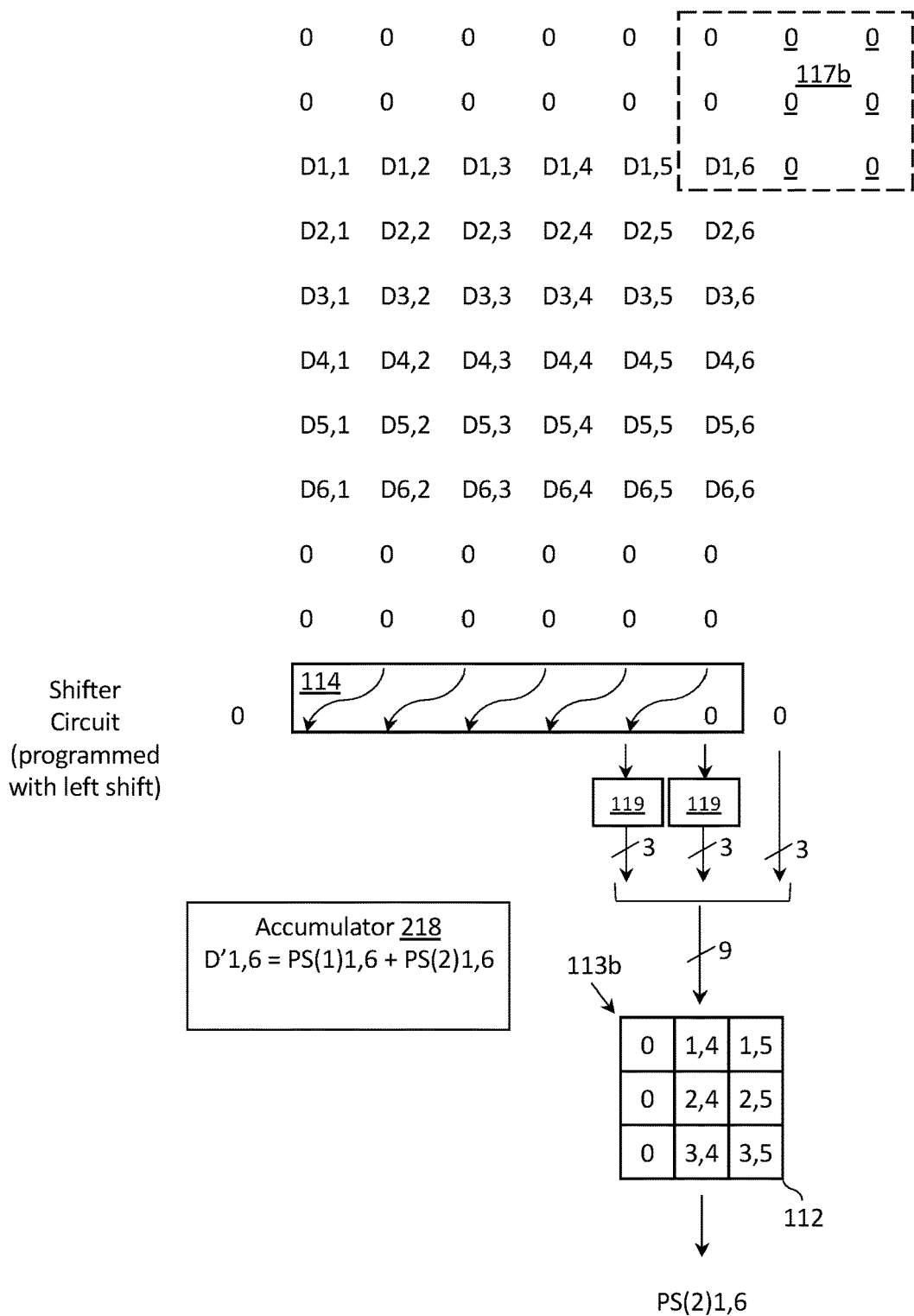

As depicted in FIG. 10B, no issues are encountered with the computation of the second partial sum PS(2)1,6, as the expected nine values of block 117b are provided to the 3×3 convolver unit 112.

Figure 10C:
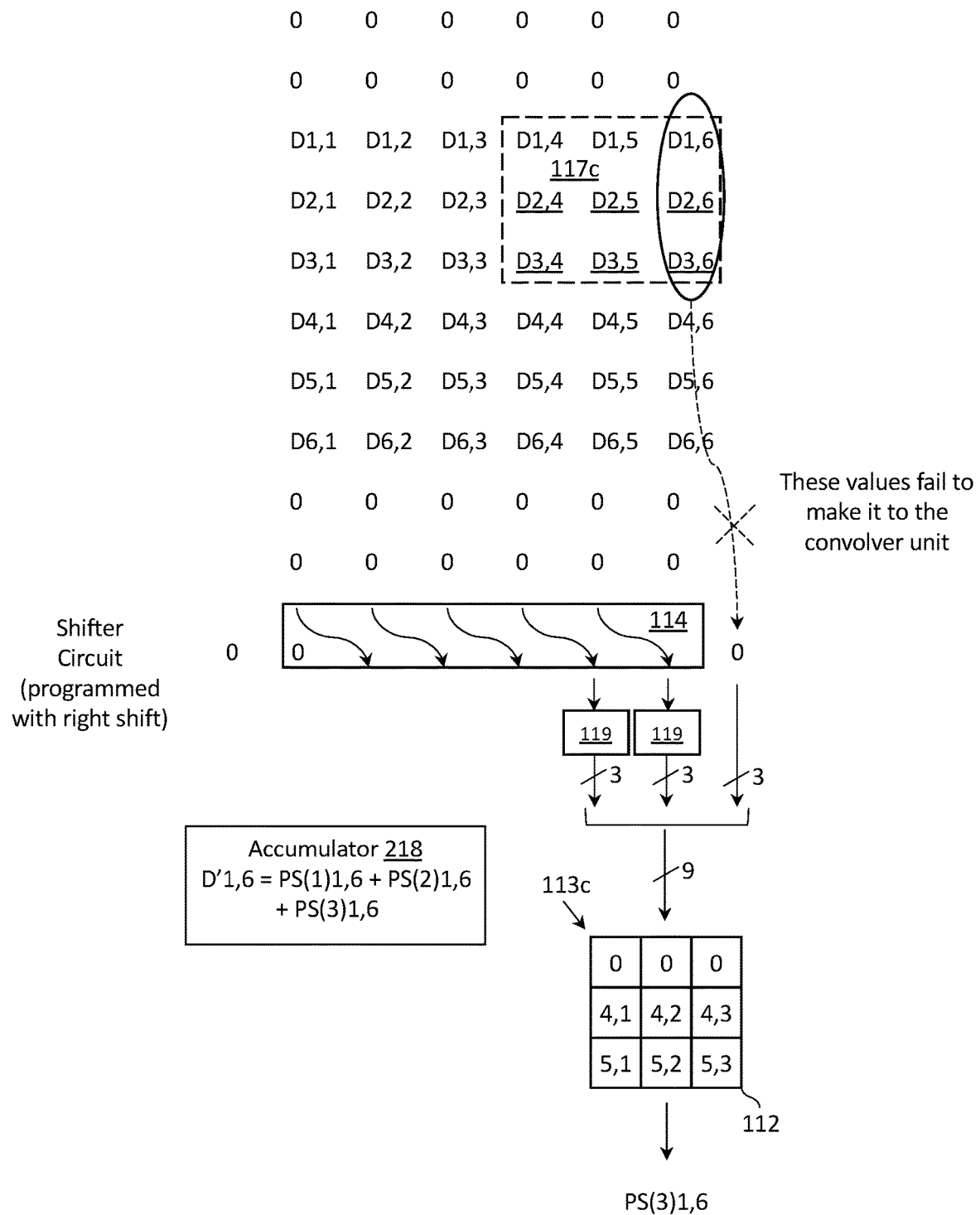

As depicted in FIG. 10C, the same issue appears in the computation of the third partial sum PS(3)1,6 in that the right-most column of values within block 117c is not provided to the 3×3 convolver unit 112, leading to an error in the computation of the partial sum PS(3)1,6. To be explicit, the partial sum PS(3)1,6 should be calculated as follows:

$$PS(3)1,6 = w4,1(D2,4) + w4,2(D2,5) + w4,3(D2,6) + w5,1(D3,4) + w5,2(D3,5) + w5,3(D3,6)$$

However, with the implementation depicted in FIG. 10C, the partial sum lacks the third and sixth terms:

$$PS(3)1,6 = w4,1(D2,4) + w4,2(D2,5) + w5,1(D3,4) + w5,2(D3,5)$$

Figure 10D:
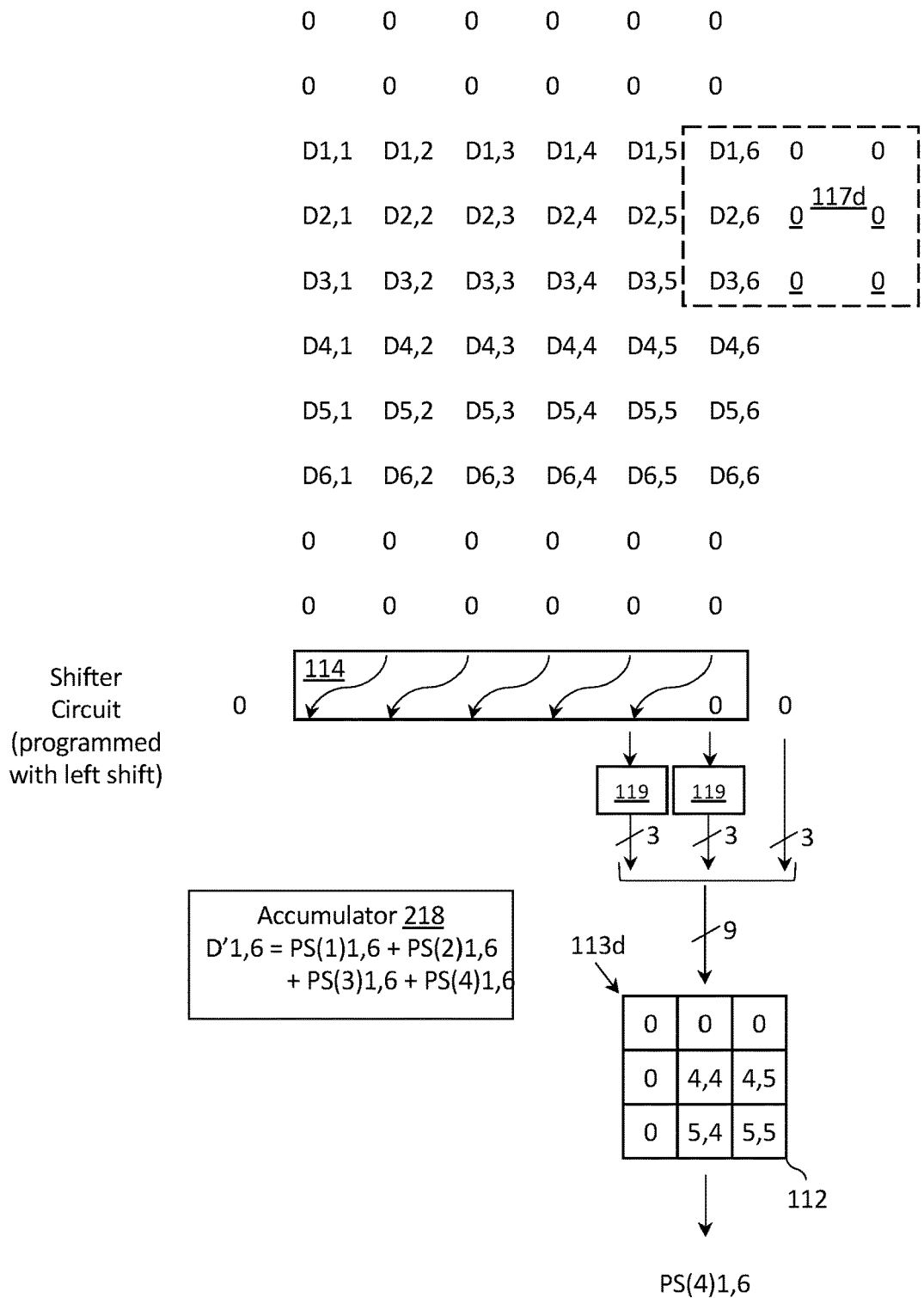

As depicted in FIG. 10D, no issues are encountered with the computation of the fourth partial sum PS(4)1,6, as the expected nine values of block 117d are provided to the 3×3 convolver unit 112.

The solution to the issue described in FIGS. 10A and 10C is explained in FIGS. 11 and 12A-12D below. The common issue encountered in the first and third partial sums is that the right-shift operation of the shifter circuit 114 is unable to provide the third column of values from the blocks 117a, 117c to the 3×3 convolver unit 112. The solution is to use different "cut lines" 119a, 119b (as depicted in FIG. 11) on the 5×5 kernel 104.

More specifically, in a first time period, a 3×3 convolver unit 112 may receive nine weights 113a', of which six are from the northwest quadrant and the remaining three set to zero to generate a first partial sum. In a second time period, the same 3×3 convolver unit 112 may receive nine weights 113b' from the northeast quadrant to generate a second partial sum. In a third time period, the same 3×3 convolver unit 112 may receive nine weights 113c', of which four are from the southwest quadrant and the remaining five are set to zero to generate a third partial sum. Finally, in a fourth time period, the same 3×3 convolver unit 112 may receive nine weights 113d', of which six are from the southeast quadrant and the remaining three are set to zero to generate a fourth partial sum. The four partial sums may be summed together to arrive at the dot product of the 25 weights of the 5×5 kernel 104 with a 5×5 block of input data. The application of the "cut lines" 121a, 121b is explained in FIGS. 12A-12D below.

Figure 12A:
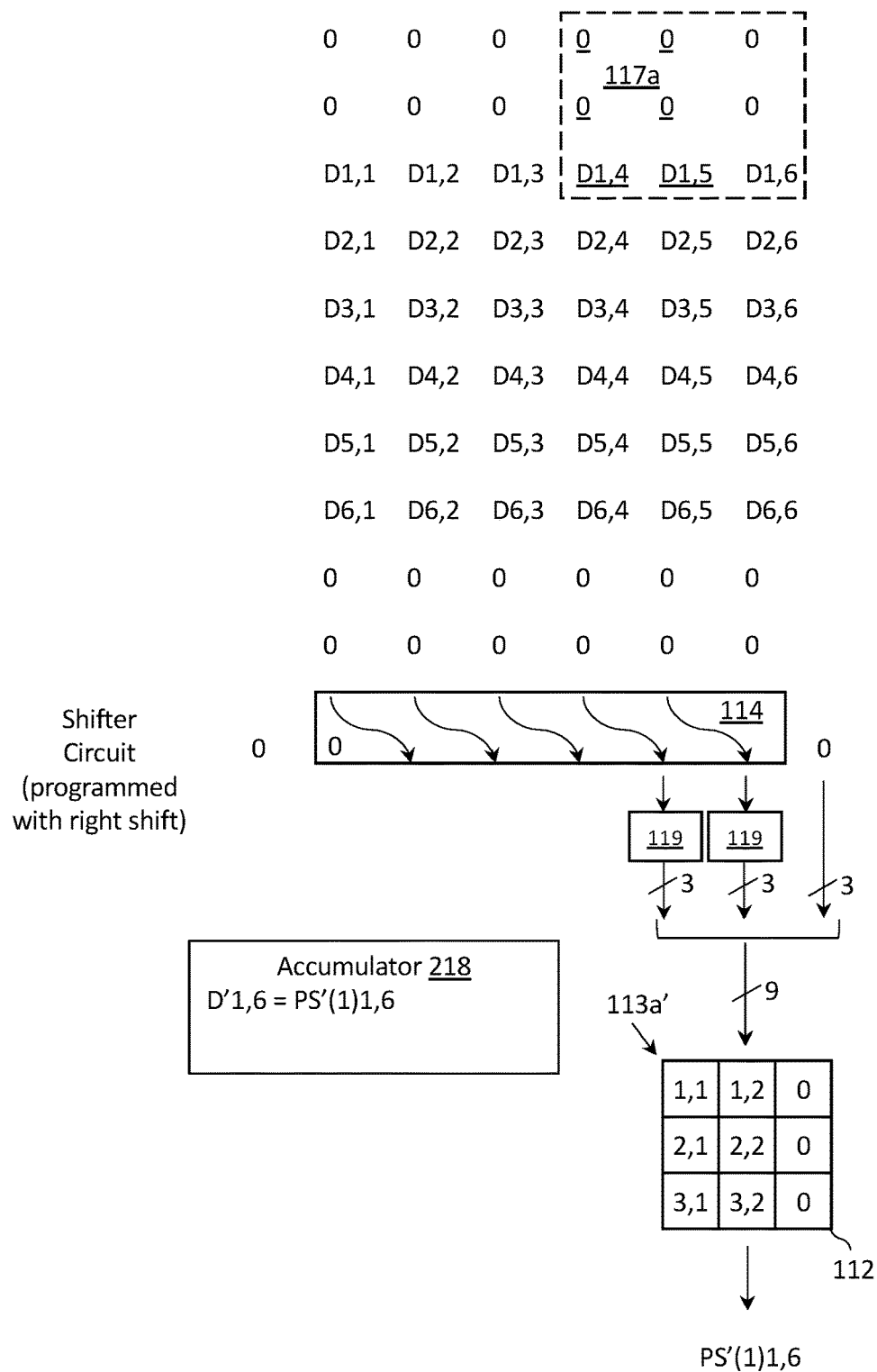
FIGS. 12A-12D depict a solution to the issue described in FIGS. 10A-10D by operating the right most 3×3 convolver unit in accordance with subsets of weights partitioned by the cut lines depicted in FIG. 11, in accordance with one embodiment of the invention.

FIGS. 12A-12D depicts a solution to the issue described in FIGS. 10A-10D by applying the weights partitioned according to the cut lines 121a, 121b depicted in FIG. 11. As shown in FIG. 12A, the nine weights indicated by 113a' have zero values in the right-most column, which means that the right-most column of values from block 117a does not factor into the computation of the first partial sum PS'(1)1,6. This is important, as these values from block 117a never get transmitted to the 3×3 convolver unit 112 as a result of the right-three inputs of the right-most 3×3 convolver unit 112 being hard-wired to zero values (in the case of a right-shift of the zero-padded input data by one column).

Figure 12B:
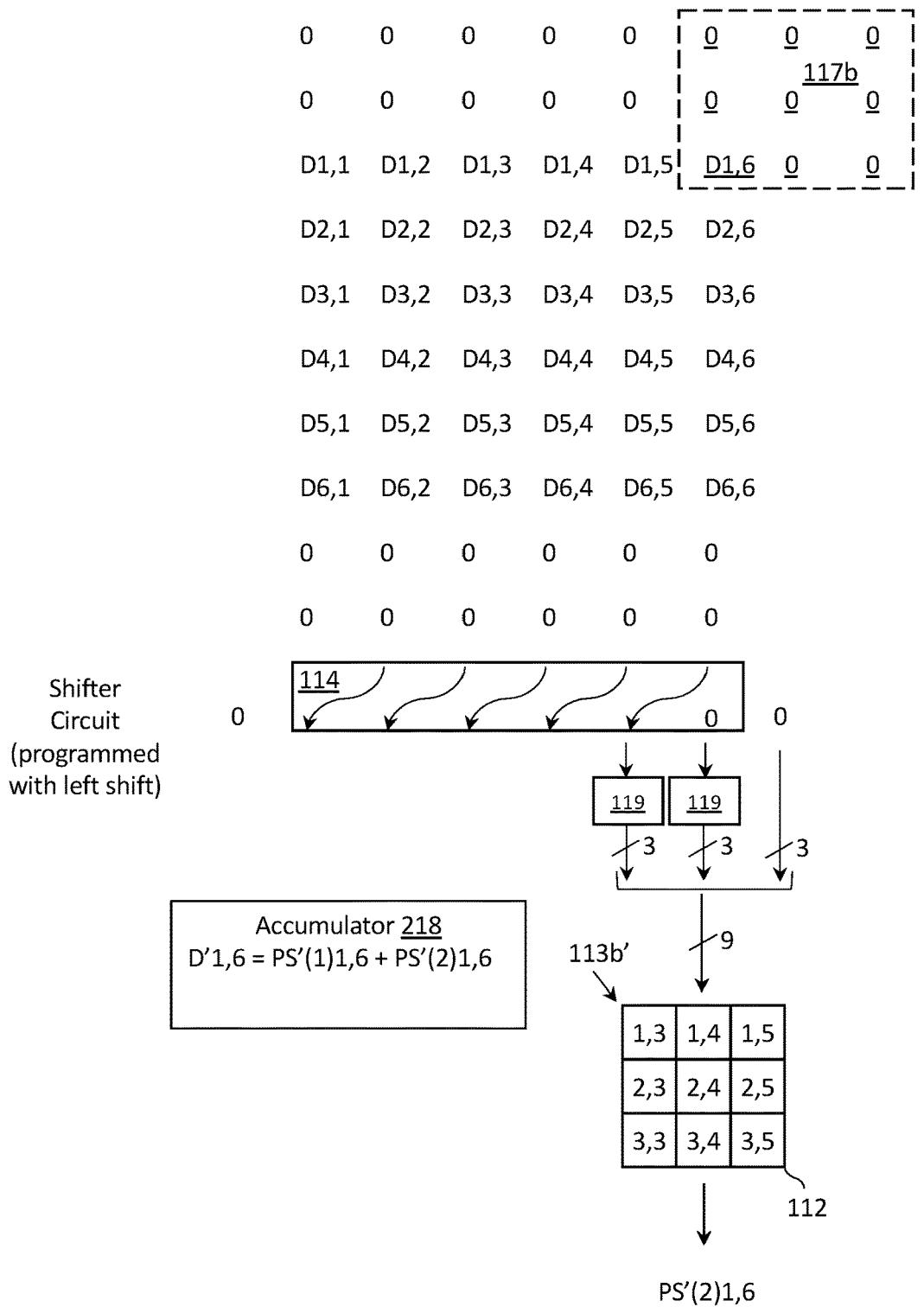

As shown in FIG. 12B, the expected nine values of block 117b are provided to 3×3 convolver unit 112 in the computation of the second partial sum PS'(2)1,6.

Figure 12C:
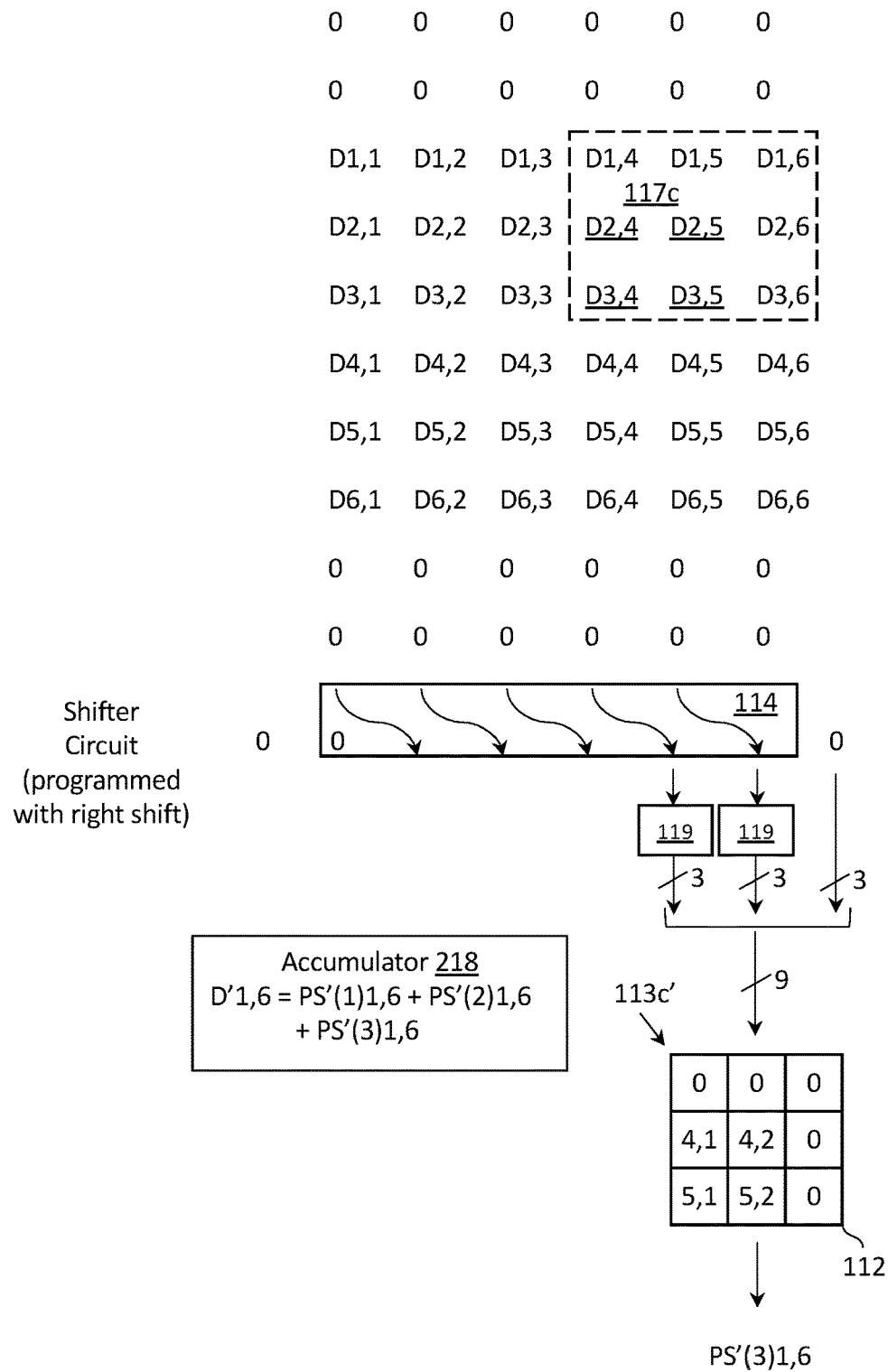

As shown in FIG. 12C, the nine weights indicated by 113c' have zero values in the right-most column, which means that the right-most column of values from block 117c does not factor into the computation of the third partial sum PS'(3)1,6. This is again important, as these values from block 117c never get transmitted to the 3×3 convolver unit 112 as a result of the right-three input of the right-most 3×3 convolver unit 112 being hard-wired to zero values.

Figure 12D:
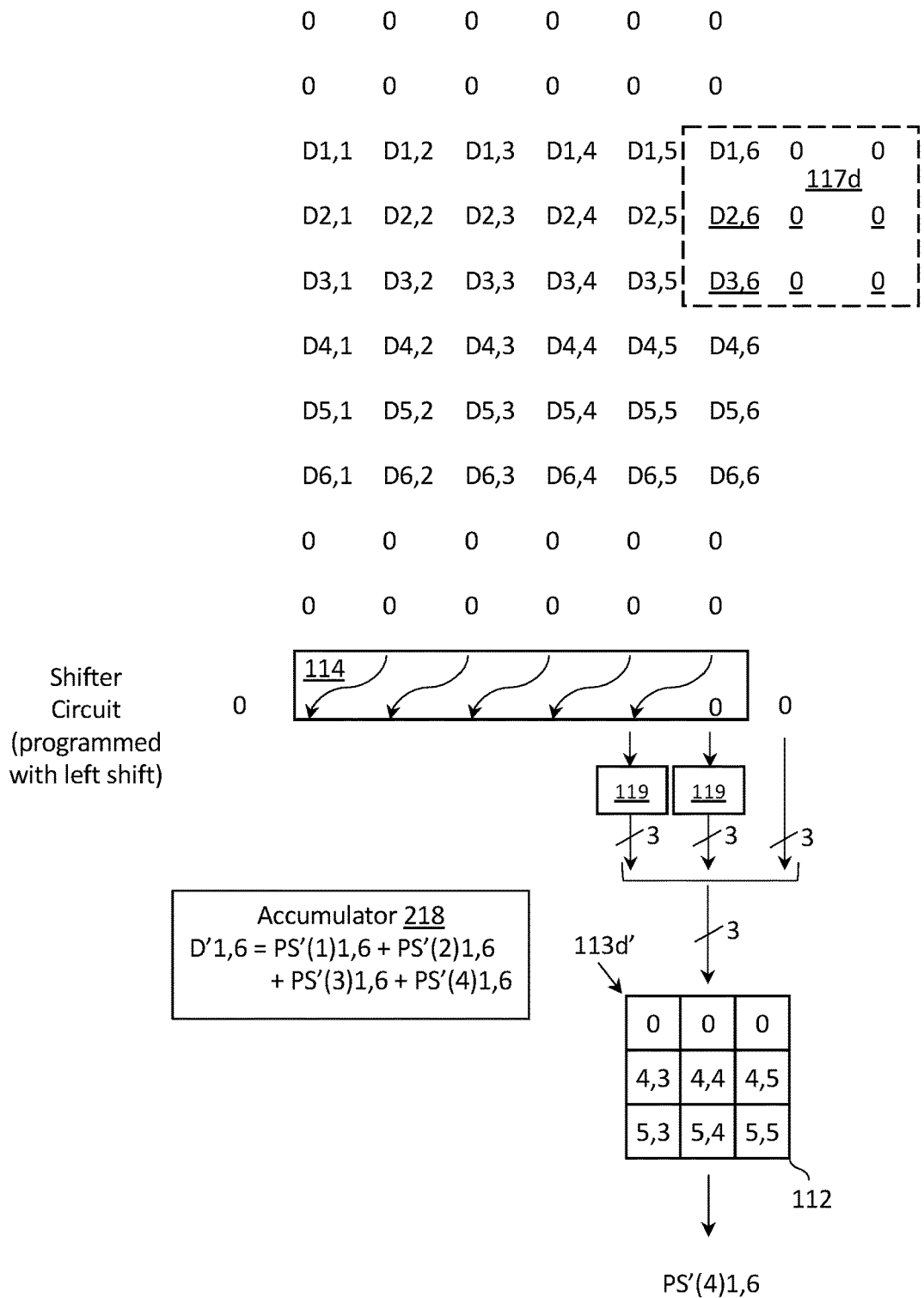

Similarly, in FIG. 12D, the expected six values of block 117d are provided to the 3×3 convolver unit 112 in the computation of the fourth partial sum PS'(4)1,6. For clarity, the partial sums in FIGS. 12A-12D are denoted with a "prime" mark to indicate that the partial sums in FIGS. 12A-12D are different from those computed in FIGS. 10A-10D.

Figure 13:
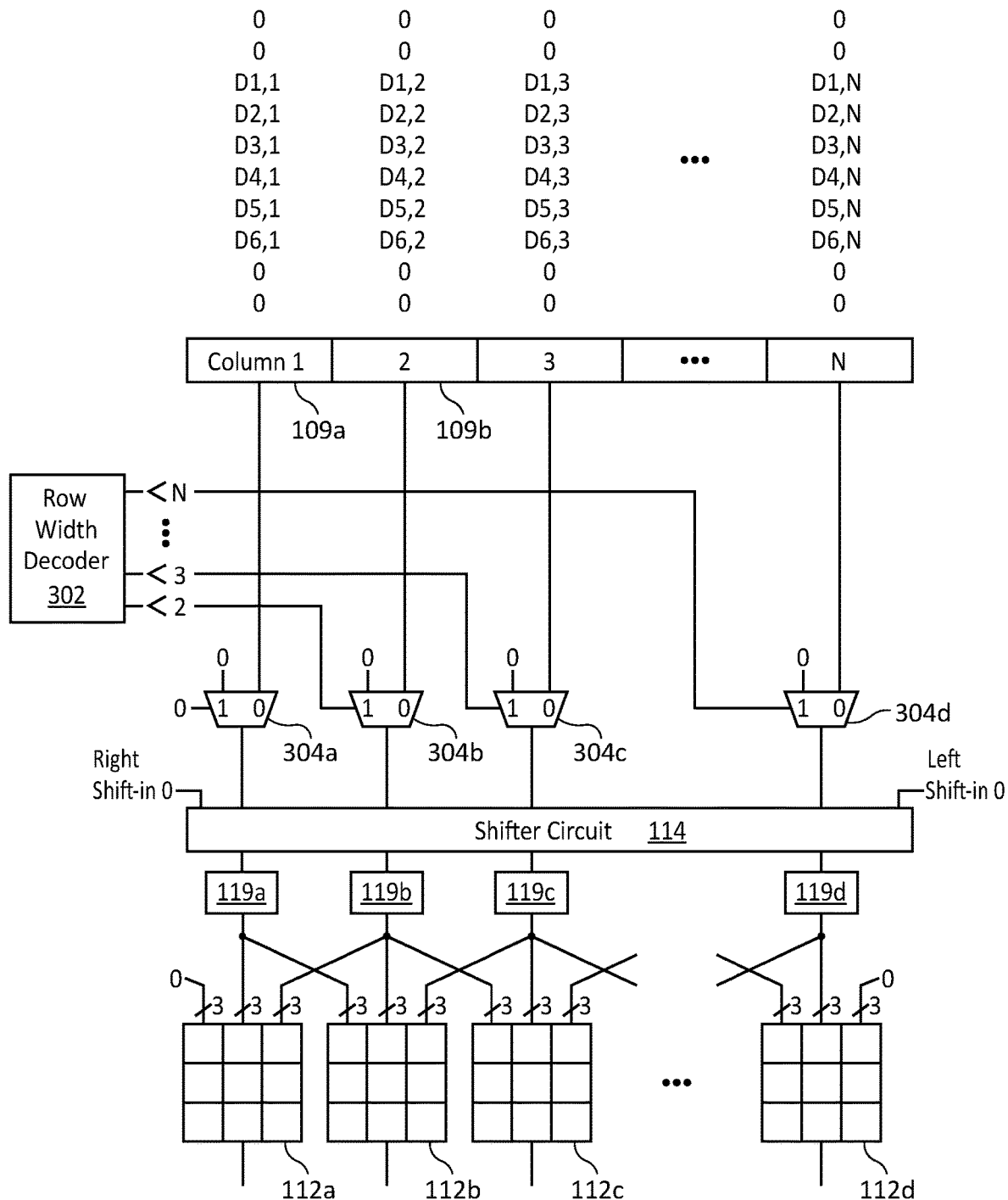
FIG. 13 depicts a logic-level block diagram of a device with a plurality of 3×3 convolver units that can be configured to convolve input data with a 5×5 kernel, in accordance with one embodiment of the invention.

FIG. 13 depicts a logic-level block diagram of a device with a plurality of 3×3 convolver units 112a-112d configured to convolve input data with a 5×5 kernel 104. For clarity, a line connecting two components in FIG. 13 represents an electrical wire capable of transmitting a digital (or analog) signal from one component to the other component. Crossing lines are not shorted unless a dot is depicted at the intersection of the crossing lines. If no dot is present, the lines represent one line crossing over another line without any electrical connection at the cross-over point.

The shifter circuit 114, staging modules 119a-119d, and the 3×3 convolver units 112 in FIG. 13 are identical to those that have previously been described in FIGS. 8A-8B, although in FIG. 13, the signal lines between the shifter circuit 114 and the staging modules 119a-119d are more explicitly depicted. Each convolver unit 112a-112d is shown with nine input signal lines (while other signal lines not depicted are also present to receive the weight values and optionally a bias value). For instance for convolver unit 112b, the left three signal lines are configured to receive data from the staging module 119a, the middle three signal lines are configured to receive data from the staging module 119b, and the right three signal lines are configured to receive data from the staging module 119c. For convolver unit 112a, the left three signal lines are hardwired to zero, and for convolver unit 112d, the right three signal lines are hardwired to zero, similar to the above discussion in FIGS. 9A-9D and 10A-10D.

The "Right Shift-in 0" indication of the shifter circuit 114 represents the scenario depicted in FIG. 8A in which the left-most output of the shifter circuit 114 is set to zero during a right shift operation. The "Left Shift-in 0" indication of the shifter circuit 114 represents the scenario depicted in FIG. 8B in which the right-most output of the shifter circuit 114 is set to zero during a left shift operation.

Multiplexors 304a-304d and row width decoder 302 are configured to adjust the row width of the data input. In the example of FIG. 13, a 0 selector signal to a respective one of the multiplexors 304a-304d causes a data column to be passed through the respective multiplexor, whereas a 1 selector signal, causes the output of the respective multiplexor to be set to zero. In the example of FIG. 13, the selector signal of the left-most multiplexor 304a is hardwired to zero, causing the first column of data to always be passed to the 3×3 convolver units 112a and 112b. As another example, if the input data only has a row width of 3 data columns, the <2 and <3 signal lines of the row width decoder 302 would be set to zero, and all other signal lines from the row width decoder 302 would be set to 1.

Column 1 (109a) represents a signal line that provides the first column of zero-padded input data (as shown in the optimized implementation of FIG. 8A with the implicit zero padding columns); column 2 (109b) represents a signal line that provides the second column of zero-padded input data (as shown in the optimized implementation of FIG. 8A with the implicit zero padding columns); and so on. For clarity, the previously described zero-padded input data from FIG. 8A have been copied above each of the column designators. In the instant example, there are six data rows, but it is understood that the number of data rows could vary.

Figure 14:
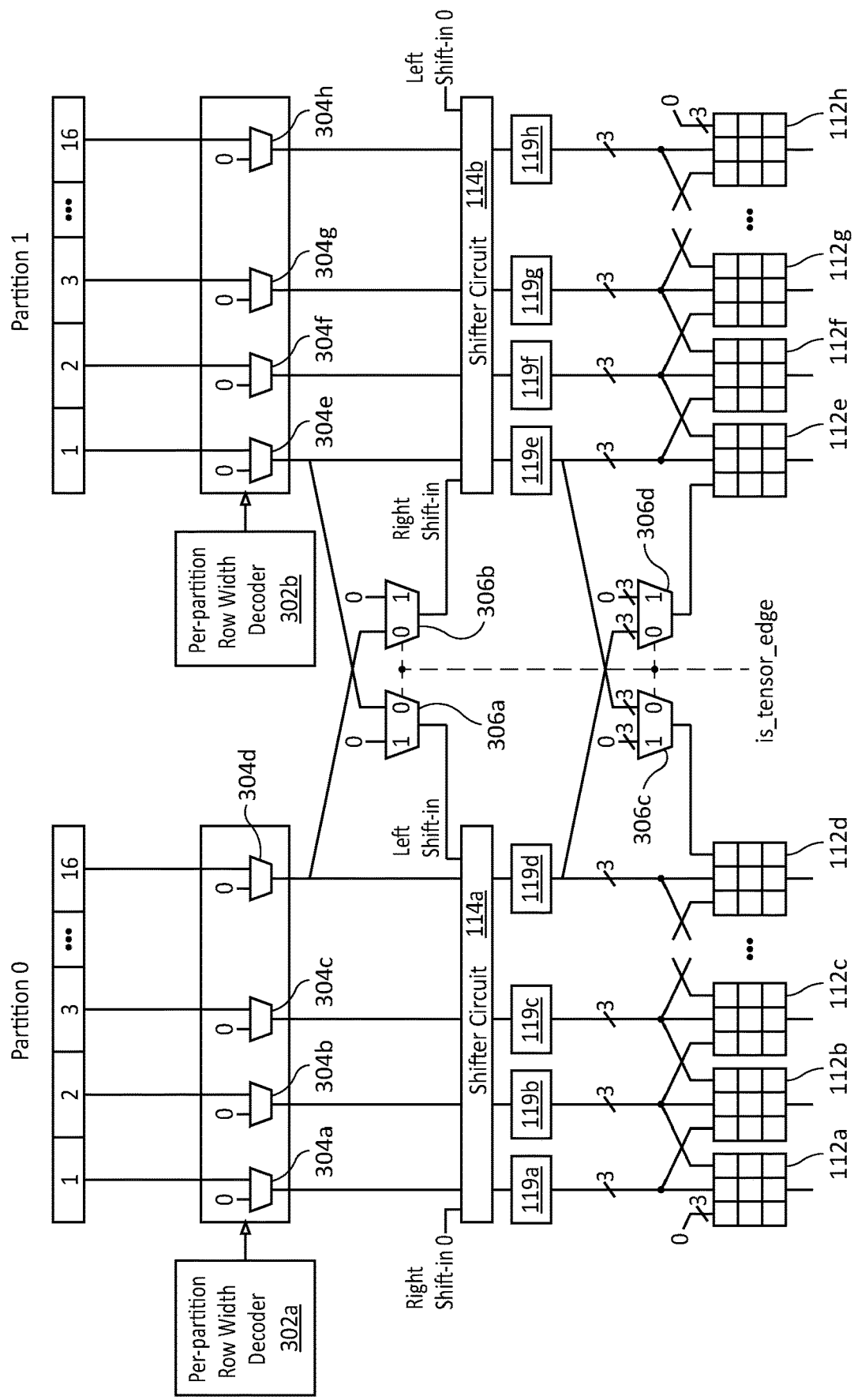
FIG. 14 depicts a logic-level block diagram of a variation of the device of FIG. 13 in which the device is specifically configured to process partitions of the input data, in accordance with one embodiment of the invention.

FIG. 14 depicts a logic-level block diagram of a variation of the device of FIG. 13 in which the device is specifically configured to perform convolution on input data that has been organized into partitions. In the present example, a partition includes sixteen columns. Two partitions are depicted in FIG. 14 while it is understood that more partitions may be employed in other embodiments.

Many of the circuit components present in FIG. 14 have already been described. For instance, row width decoder 302a and 302b are two instances of the row width decoder 302 depicted in FIG. 13. Multiplexors 304a-304d receive control signals from row width decoder 302a in order to set the row width of the input data from partition 0. Similarly, multiplexors 304e-304h receive control signals from row width decoder 302b in order to set the row width of the input data from partition 1. Shifter circuits 114a and 114b are two instances of the previously described shifter circuit 114. Staging modules 119a-119h are instances of the previously described staging module 119. Likewise, 3×3 convolver units 112a-112h are instances of the previously described 3×3 convolver unit 112.

The circuit components not previously discussed are multiplexors 306a-306d and its control signal "is_tensor_edge" (depicted in dashed line to better distinguish over the other data/signal paths). These components allow the two partitions (i.e., partition 0 and partition 1) to operate independently of one another, or allow the two partitions to be joined together and operated as one. More specifically, if the signal "is_tensor_edge" were set to 1, the multiplexors 306a-306d would output zero values, and essentially the left and right halves of the logic diagram reduce to two separate instances of the logic diagram depicted in FIG. 13 that would be capable of operating in parallel to one another. On the other hand, if the signal "is_tensor_edge" were set to 0, multiplexors 306a and 306b in essence join shifter circuit 114a and shifter circuit 114b into a single shifter circuit and multiplexors 306c and 306d provide crossover signal paths downstream of the shifter circuits 114a, 114b.

As a specific example, if "is_tensor_edge" were set to 0 and the shifter circuits 114a, 114b were set to operate in the left shift mode, column 1 of partition 1 would be transmitted to convolver units 112d, 112e and one additional convolver unit immediately to the left of convolver unit 112d (not depicted). Similarly, if "is_tensor_edge" were set to 0 and the shifter circuits 114a, 114b were set to operate in the right shift mode, column 16 of partition 0 would be transmitted to convolver units 112d-112f.

FIG. 15 depicts a plurality of 3×3 convolver units that are configured to convolve zero-padded input data with a 3×3 kernel having the following nine weights:

w1,1 w1,2 w1,3
w2,1 w2,2 w2,3 w3,1 w3,2 w3,3

The input data shown in FIG. 15 (Di,j) represent the output of the staging modules 119 at each clock cycle. In contrast to convolution with a 5×5 kernel in which there were two zero padding columns on the right and left of the input data, the present convolution with a 3×3 kernel only includes a single column of zero padding on the left and a single column of zero padding right of the input data values. Such columns of zero padding are implemented by setting the left-three inputs of convolver 112*a* and the right-three inputs of convolver 112*f* to zero. The embodiment shown in FIG. 15 is not the focus of the application, but is shown to explain that the circuit shown in FIG. 13 can also be configured to convolve input data with a 3×3 kernel. To note, the shifter circuit 114 is not shown in FIG. 15, but it is understood that the shifter circuit 114 could be set in a pass-through mode (without any shifting) to arrive at the configuration depicted in FIG. 15.

FIGS. 16A-16D depict the device of FIG. 13 configured to convolve input data with a 5×5 kernel 104 having the following 25 weights:

w1,1 w1,2 w1,3 w1,4 w1,5
w2,1 w2,2 w2,3 w2,4 w2,5
w3,1 w3,2 w3,3 w3,4 w3,5
w4,1 w4,2 w4,3 w4,4 w4,5
w5,1 w5,2 w5,3 w5,4 w5,5

In each of FIGS. 16A-16D, the input data Di,j represents the output of the staging modules 119 at a particular clock cycle. By way of the shifter circuit 114 (not shown in FIGS. 16A-16D), the zero-padded input data Di,j is shifted one column to the right in FIGS. 16A and 16C, while the zero-padded input data Di,j is shifted one column to the left in FIGS. 16B and 16D. Further, while each of the previous figures (i.e., FIGS. 9A-9D, 10A-10D and 12A-12D) only showed the weights of an individual 3×3 convolver unit 112 over four time periods, FIGS. 16A-16D provides additional context by showing the weighs for all six 3×3 convolver units 112*a*-112*f* over these four time periods. FIGS. 16A-16D are now explained in detail.

Figure 16A:
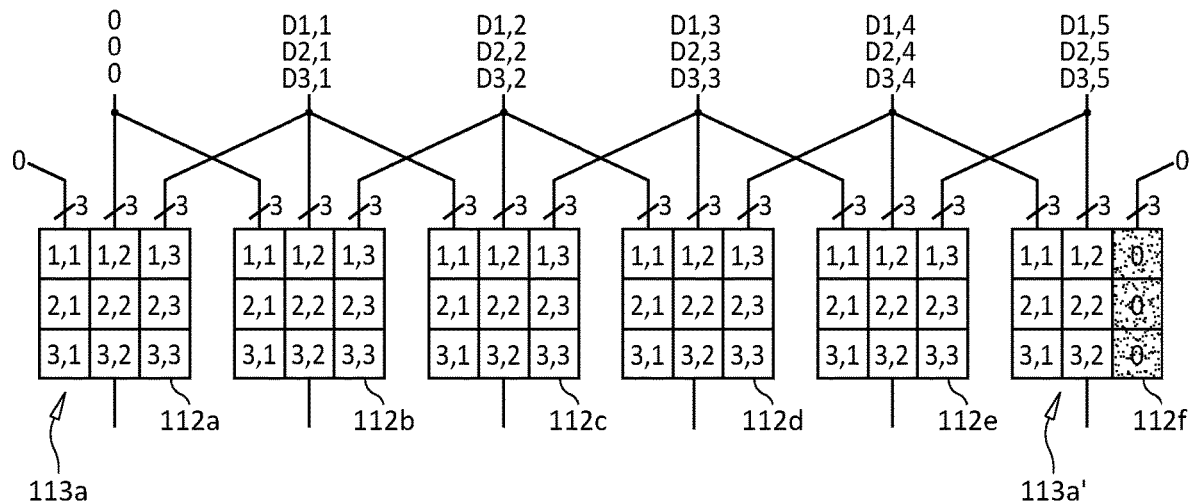
FIGS. 16A-16D depict the operation of the device of FIG. 13 to emulate the functionality of a 5×5 kernel using a plurality of 3×3 convolver units, in accordance with one embodiment of the invention.
Figure 16B:
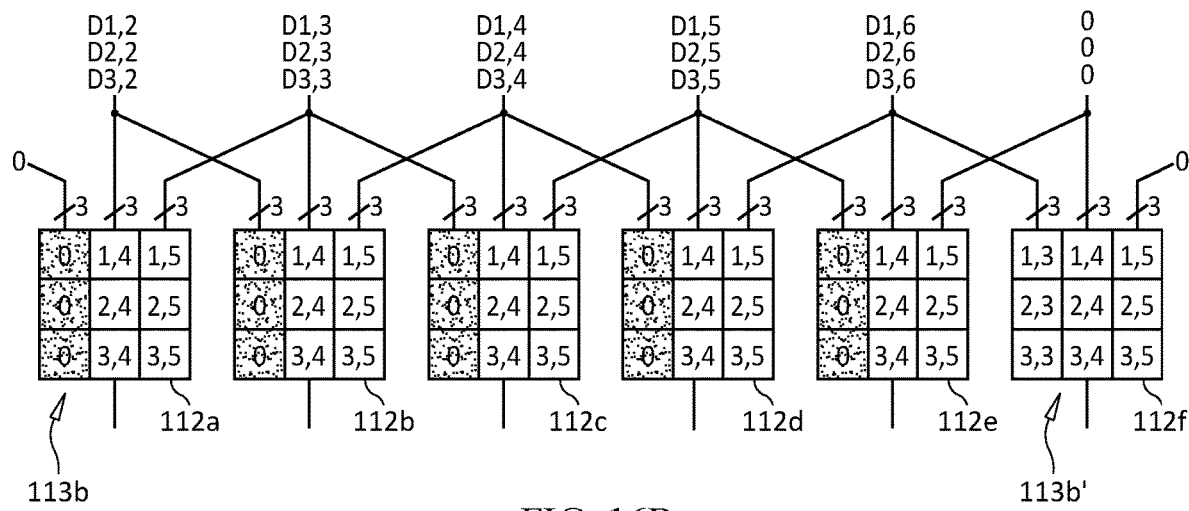
Figure 16C:
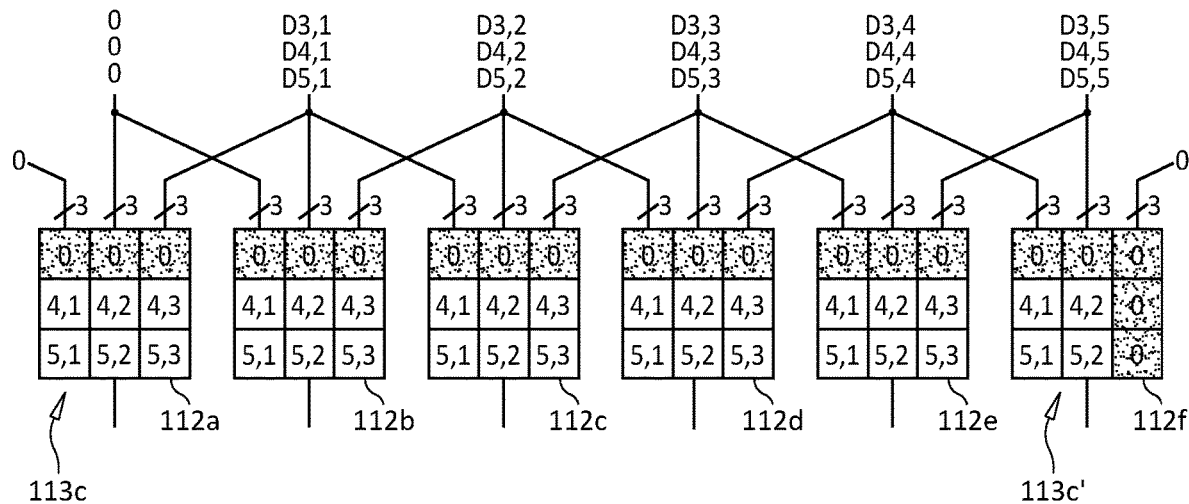
Figure 16D:
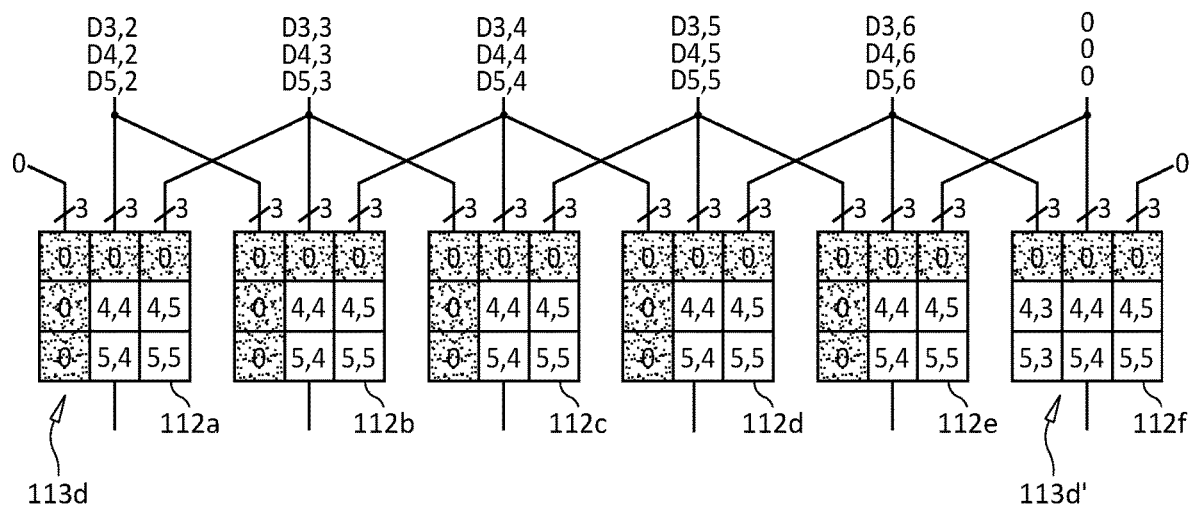
Figure 17A:
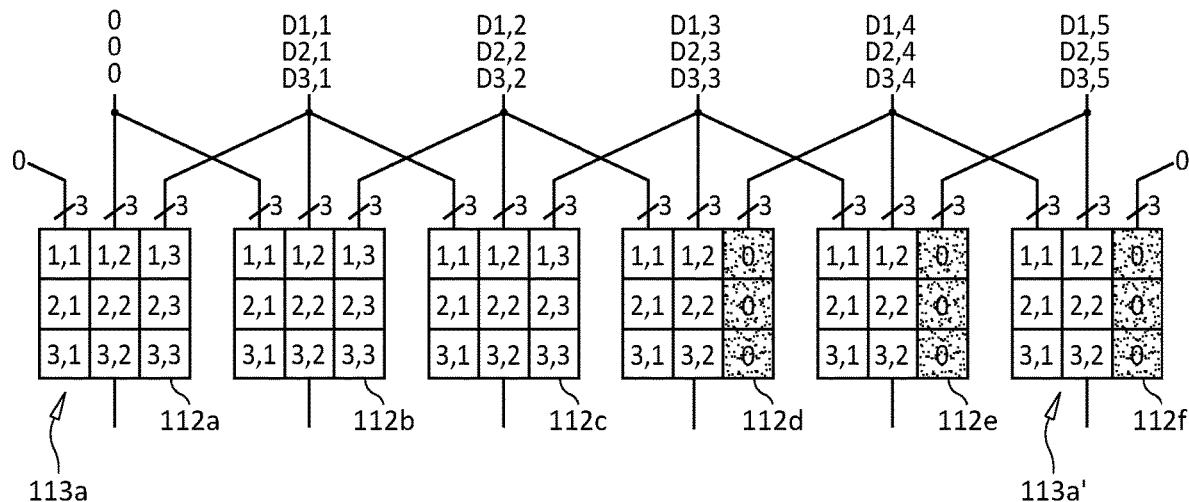
FIGS. 17A-17D depict an alternative operation of the device of FIG. 13 to emulate the functionality of a 5×5 kernel using a plurality of 3×3 convolver units, in accordance with one embodiment of the invention.
Figure 17B:
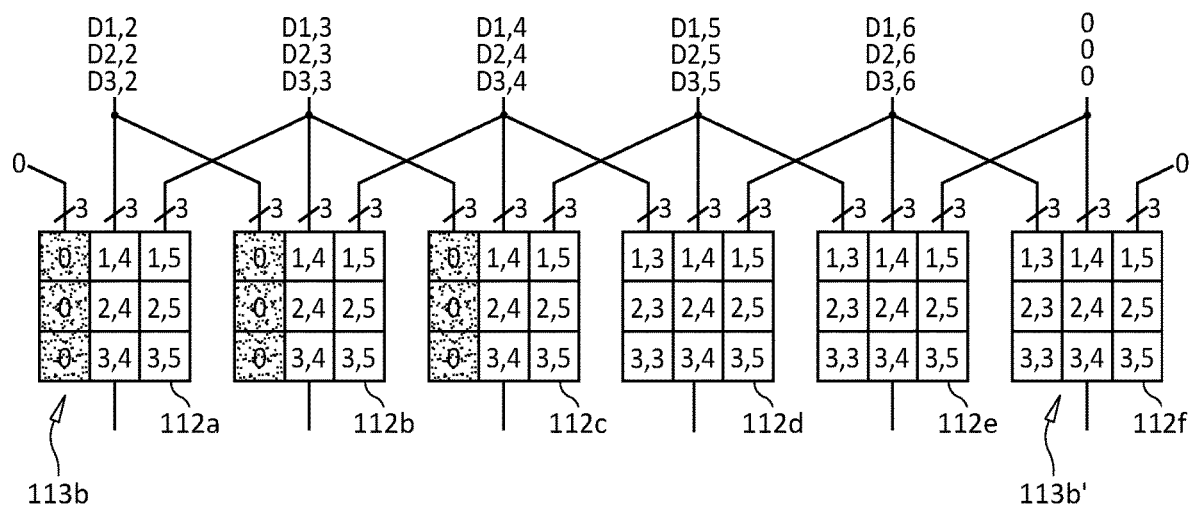
Figure 17C:
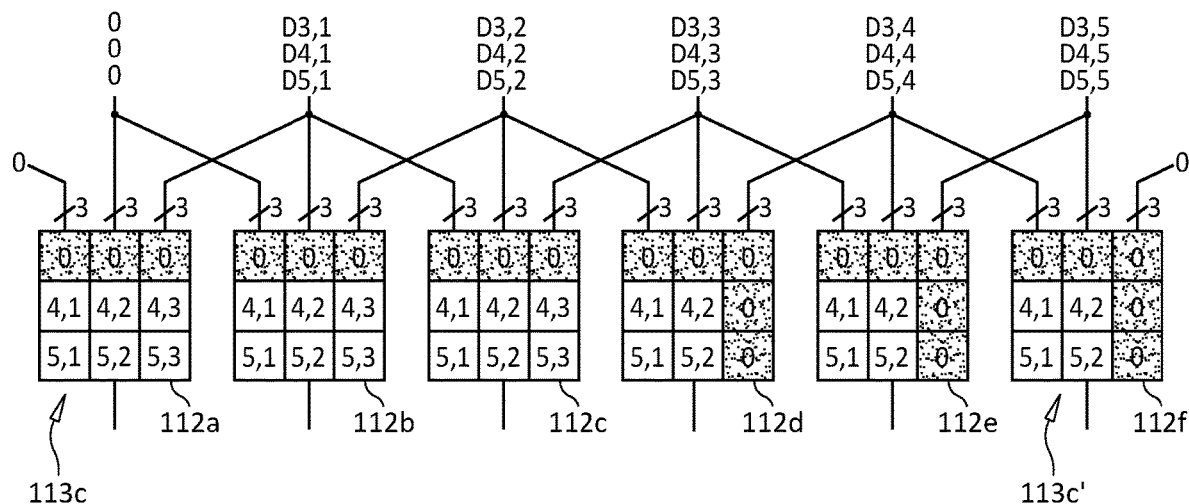
Figure 17D:
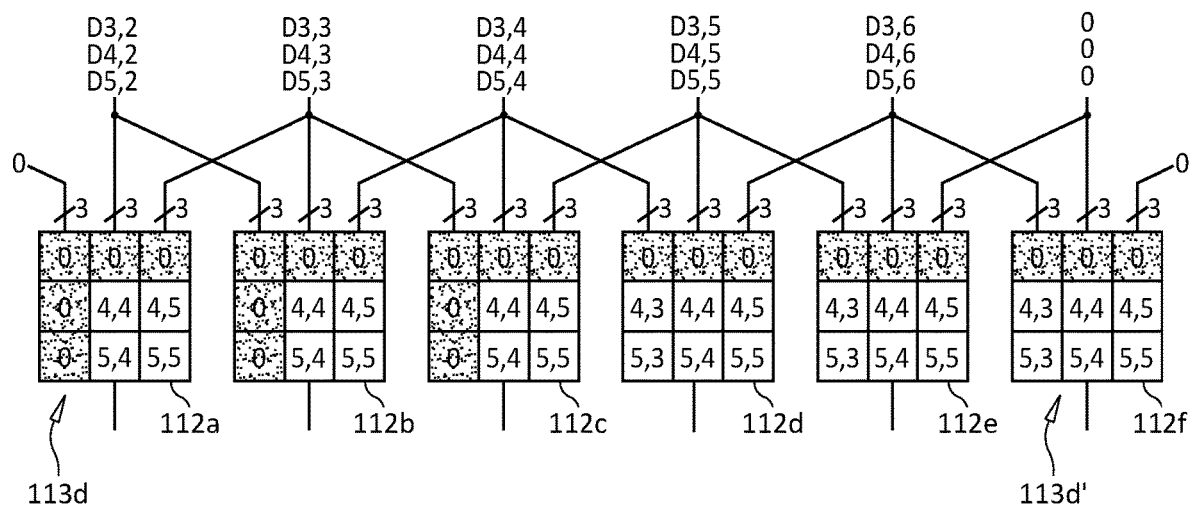

FIG. 16A depicts the operation of the device of FIG. 13 to calculate a first plurality of partial sums: PS(1)3,1 . . . PS(1)3,6. The values from rows 3-5 of the zero-padded input data (see, e.g., FIG. 8A) are shifted one column to the right. FIG. 16B depicts the operation of the device of FIG. 13 to calculate a second plurality of partial sums: PS(2)3,1 . . . PS(2)3,6. The values from rows 3-5 of the zero-padded input data (see, e.g., FIG. 8A) are shifted one column to the left. FIG. 16C depicts the operation of the device of FIG. 13 to calculate a third plurality of partial sums: PS(3)3,1 . . . PS(3)3,6. The values from rows 5-7 of the zero-padded input data (see, e.g., FIG. 8A) are shifted one column to the right. FIG. 16D depicts the operation of the device of FIG. 13 to calculate a fourth plurality of partial sums: PS(4)3,1 . . . PS(4)3,6. The values from rows 5-7 of the zero-padded input data (see, e.g., FIG. 8A) are shifted one column to the left. The first through fourth plurality of partial sums may be summed in an element-wise manner to form the third row of output data values: D'3,1 D'3,6.

Viewed in a different way, the first column of 3×3 convolver units 112*a* across FIGS. 16A-16D shows the time progression of the nine weights 113*a*-113*d* chosen in accordance with the four quadrants formed by cut lines 111*a*, 111*b* previously described in FIG. 4. Such progression of the nine weights also corresponds to those weights shown FIGS. 9A-9D. Similarly, the last column of 3×3 convolver units 112*f* across FIGS. 16A-16D shows the progression of the nine weights 113*a*'-113*d*' chosen in accordance with the four quadrants formed by cut lines 121*a*, 121*b* previously described in FIG. 11. Such progression of the nine weights also corresponds to those weights shown FIGS. 12A-12D.

FIGS. 17A-17D depict the operation of the device of FIG. 13 with an alternative selection of weights. As one initial note, the convolver units 112*b*, 112*c*, 112*d* and 112*e* that are located away from the right and left "edges" can be operated with either set of nine weights (i.e., 113*a*-113*d* or 113*a*'-113*d*'). In the embodiment depicted in FIGS. 17A-17D, convolver units 112*a*-112*c* are operated with the set 113*a*-113*d*, whereas convolver units 112*d*-112*f* are operated with the set 113*a*'-113*d*'. The embodiment depicted in FIGS. 17A-17D is preferable in the instances where the plurality of convolver units 112*a*-112*f* are further divided into equal numbered groups of convolver units and each group of convolver units must be operated with the same nine weights.

While the techniques for convolving a 2-D array of zero-padded input data with a 5×5 kernel 104 was described, it is understood that the techniques described herein may be applied to data with multiple input channels. For instance if there were x input channels, each output would require the computation of 4(x) number of partial sums. Further, while the techniques were described for convolving zero-padded input data, the techniques may be modified for input data that does not have zero padding. Further while the techniques have been discussed in the context of convolving input data with a single 5×5 kernel, it is understood that the techniques can be applied in the context where convolution with multiple 5×5 kernels is performed. In such case, multiple rows of 3×3 convolver units 112 would be employed, with one row corresponding to each of the 5×5 kernels.

Thus, methods and systems for using a shifter circuit and 3×3 convolver units to emulate the functionality of larger sized convolver units have been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A device, comprising:
    a shifter circuit with a plurality of input signals logically numbered from 1 . . . N and a plurality of output signals logically numbered from 1 . . . N, wherein the shifter circuit is programmable to right shift the plurality of input signals by a first integer i greater than or equal to 1, such that the output signals i+1 . . . N are electrically connected to the input signals 1 . . . N−i, respectively, and is programmable to left shift the plurality of input signals by a second integer j greater than or equal to 1, such that the output signals 1 . . . N−j are electrically connected to the input signals j+1 . . . N, respectively, wherein the shifter circuit is a combinatorial circuit without any storage elements, and comprises a plurality of multiplexors, each with three selectable inputs; and
    a plurality of convolver units including a first convolver unit and a second convolver unit,
    wherein a first group of signals from the plurality of output signals of the shifter circuit is communicated to the first convolver unit, and
    wherein a second group of signals from the plurality of output signals of the shifter circuit is communicated to the second convolver unit.

2. The device of claim 1, wherein the shifter circuit is further programmable to pass the plurality of input signals to the plurality of output signals without any data rearrangement, such that the output signals 1 . . . N are electrically connected to the input signals 1 . . . N, respectively.

3. The device of claim 1, wherein the plurality of convolver units comprises a plurality of 3×3 convolver units.

4. The device of claim 1, wherein the first convolver unit is configured to compute a first dot product based on the first group of signals, and the second convolver unit is configured to compute a second dot product based on the second group of signals.

5. The device of claim 1, wherein the first group of signals comprises the output signals 1, 2 and 3 from the shifter circuit, and wherein the second group of signals comprises the output signals 2, 3 and 4 from the shifter circuit.

6. The device of claim 1, wherein the first group of signals comprises the output signals 1 and 2 from the shifter circuit, wherein the second group of signals comprises the output signals 1, 2 and 3 from the shifter circuit, and the first convolver unit further receives zero values.

7. The device of claim 1, further comprising N multiplexors, wherein the plurality of input signals of the shifter circuit are received from respective outputs of the N multiplexors.

8. The device of claim 7, wherein each of the N multiplexors is programmable to output a zero value or pass a data value.

9. The device of claim 1, wherein the integer i is equal to 1, the integer j is equal to 1, and wherein the first convolver unit receives nine weights and is configured to:
compute a first dot product based on the first group of signals generated with the shifter circuit programmed to right shift the plurality of input signals;
compute a second dot product based on the first group of signals generated with the shifter circuit programmed to left shift the plurality of input signals;
compute a third dot product based on the first group of signals generated with the shifter circuit programmed to right shift the plurality of input signals;
compute a fourth dot product based on the first group of signals generated with the shifter circuit programmed to left shift the plurality of input signals; and
compute a sum of the first dot product, the second dot product, the third dot product and the fourth dot product.

10. The device of claim 9, wherein during the computation of the first dot product, each of the nine weights are selected from a 5×5 kernel.

11. The device of claim 10, wherein during the computation of the second dot product, three of the nine weights each comprise zero values, and six of the nine weights are selected from the 5×5 kernel.

12. The device of claim 10, wherein during the computation of the third dot product, three of the nine weights each comprise zero values, and six of the nine weights are selected from the 5×5 kernel.

13. The device of claim 10, wherein during the computation of the fourth dot product, five of the nine weights each comprise zero values, and four of the nine weights are selected from the 5×5 kernel.

14. The device of claim 1,
wherein when the shifter circuit is programmed to right shift the plurality of input signals by the first integer i equal to 1, the output signal 1 of the shifter circuit is connected to a zero value, and
wherein when the shifter circuit is programmed to right shift the plurality of input signals by the first integer i greater than 1, the output signals 1 . . . i of the shifter circuit are connected to a zero value.

15. The device of claim 1,
wherein when the shifter circuit is programmed to left shift the plurality of input signals by the second integer j equal to 1, the output signal N of the shifter circuit is connected to a zero value, and
wherein when the shifter circuit is programmed to left shift the plurality of input signals by the second integer j greater than 1, the output signals N−j+1 N are connected to a zero value.

16. The device of claim 1, wherein the first convolver unit receives a first, second, third and fourth plurality of weights that are selected in accordance with a first partition of a 5×5 kernel, and wherein the second convolver unit receives a fifth, sixth, seventh and eighth plurality of weights that are selected in accordance with a second partition of the 5×5 kernel distinct from the first partition.

17. The device of claim 16, wherein the first, second, third and fourth plurality of weights are received over four different time periods.

18. The device of claim 16, wherein the fifth, sixth, seventh and eighth plurality of weights are received over four different time periods.

19. The device of claim 1, wherein the first group of signals from the plurality of output signals of the shifter circuit is communicated to the first convolver unit through a plurality of staging modules.

20. The device of claim 1, wherein the second group of signals from the plurality of output signals of the shifter circuit is communicated to the second convolver unit through a plurality of staging modules.

21. The device of claim 1,
wherein when the shifter circuit is programmed to right shift the plurality of input signals, the first group of signals communicated to the first convolver unit comprises the input signals 1, 2 and 3 to the shifter circuit, and the second group of signals communicated to the second convolver unit comprises the input signals 2, 3 and 4 to the shifter circuit, and
wherein when the shifter circuit is programmed to left shift the plurality of input signals, the first group of signals communicated to the first convolver unit comprises the input signals 3, 4 and 5 to the shifter circuit, and the second group of signals communicated to the second convolver unit comprises the input signals 4, 5 and 6 to the shifter circuit.

* * * * *